United States Patent
Salter et al.

(10) Patent No.: US 12,325,396 B2
(45) Date of Patent: Jun. 10, 2025

(54) METHODS AND APPARATUS TO DETERMINE BRAKE SYSTEM HEALTH

(71) Applicant: Ford Global Technologies, LLC, Dearborn, MI (US)

(72) Inventors: Stuart C. Salter, White Lake, MI (US); Brendan Diamond, Grosse Pointe, MI (US); Timilehin Ogunbekun, Livonia, MI (US); Ryan O'Gorman, Beverly Hills, MI (US); David Brian Glickman, Southfield, MI (US); Kenneth Patrick McHugh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 496 days.

(21) Appl. No.: 17/751,383

(22) Filed: May 23, 2022

(65) Prior Publication Data
US 2023/0373455 A1 Nov. 23, 2023

(51) Int. Cl.
*B60T 17/22* (2006.01)

(52) U.S. Cl.
CPC ......... *B60T 17/221* (2013.01); *B60T 2210/20* (2013.01); *B60T 2210/36* (2013.01); *B60T 2250/04* (2013.01); *B60T 2270/88* (2013.01)

(58) Field of Classification Search
CPC .............. B60T 17/221; B60T 2210/20; B60T 2210/36; B60T 2250/04; B60T 2270/88
USPC ......................................................... 701/70
See application file for complete search history.

(56) References Cited

U.S. PATENT DOCUMENTS

| | | | | |
|---|---|---|---|---|
| 10,501,064 B2 * | 12/2019 | Pinto, IV | ................. | B60T 7/22 |
| 10,549,739 B2 * | 2/2020 | Kasper | ................. | B60T 8/1701 |
| 10,700,773 B1 * | 6/2020 | Hubbell | ................. | B60R 1/07 |
| 11,164,463 B2 * | 11/2021 | Szymczak | ............... | B60T 17/22 |
| 2022/0348227 A1 * | 11/2022 | Foster | ................. | G06V 20/588 |

FOREIGN PATENT DOCUMENTS

CN 109685273 A 4/2019

* cited by examiner

*Primary Examiner* — Hung Q Nguyen
*Assistant Examiner* — Anthony Donald Taylor, Jr.
(74) *Attorney, Agent, or Firm* — Lorne Forsythe; Hanley, Flight & Zimmerman, LLC

(57) ABSTRACT

Methods and apparatus to determine brake pad wear are disclosed herein. An example vehicle disclosed herein includes a brake, memory, and a processor to execute instructions to detect the vehicle is in operation on a road, determine a deceleration capability of the brake in response to a first brake check event, compare the deceleration capability of the vehicle to a first threshold, and in response to determining the deceleration capability of the vehicle does not satisfy the first threshold, cause the vehicle to navigate to an exit of the road prior to a portion of the road with a grade higher than a threshold grade.

20 Claims, 13 Drawing Sheets

| | 502 COMPONENT | 504 LEVEL OF DERATE | |
|---|---|---|---|
| 506A | BRAKE PADS | 6 | 508A |
| 506B | BRAKE ROTOR | 3 | 508B |
| 506C | MOTOR | 0 | 508C |
| 506D | ISC | 0 | 508D |
| 506E | HIGH VOLTAGE BATTERY | 0 | 508E |

FIG. 5

| VEHICLE PERFORMANCE EVALUATION AND RECOMMENDATION ||
|---|---|
| DECELERATION CAPABILITY (MINIMIUM CAPABILITY = 0.65g) | 0.63g |
| DESIRED COOL OFF PERIOD | 12.3 min |
| RECOMMENDATION | STOP THE VEHICLE AT NEXT EXIT |

FIG. 6

METHODS AND APPARATUS TO DETERMINE BRAKE SYSTEM HEALTH

FIELD OF THE DISCLOSURE

This disclosure relates generally to vehicles and, more particularly, to methods and apparatus to determine brake system health.

BACKGROUND

Many vehicles include a brake-by-wire system. Unlike hydraulic brakes, the electric brakes of brake-by-wire systems retard the rotation of wheels of vehicles via electric actuators. Some electric brake systems (EBS) are configured such that, when the driver activates the brakes (e.g., via a brake pedal, etc.), an electrical command is sent to the actuators of the brakes, thereby causing a braking force to be applied to the wheels. Many EBS configurations include mechanical features that enable the vehicle to stop in the event of an electrical fault.

SUMMARY

An example vehicle disclosed herein includes a brake, memory, and a processor to execute instructions to detect the vehicle is in operation on a road, determine a deceleration capability of the brake in response to a first brake check event, compare the deceleration capability of the vehicle to a first threshold, and in response to determining the deceleration capability of the vehicle does not satisfy the first threshold, cause the vehicle to navigate to an exit of the road prior to a portion of the road with a grade higher than a threshold grade.

An example non-transitory computer readable medium disclosed herein comprising instructions, which, when executed cause a processor to detect a vehicle is in operation on a road with a grade, the grade higher than a threshold grade, determine a deceleration capability of a brake of the vehicle, compare the deceleration capability of the vehicle to a first threshold, and in response to determining the deceleration capability of the vehicle does not satisfy the first threshold, cause the vehicle to navigate from a first lane to a second lane, second lane closer to a runaway truck ramp than the first lane.

An example method disclosed herein includes detecting a vehicle is in operation on a road, determine a deceleration capability of a brake of the vehicle in response to a first brake check event, comparing the deceleration capability of the vehicle to a first threshold, and in response to determining the deceleration capability of the vehicle does not satisfy the first threshold, causing the vehicle to navigate to an exit of the road prior to a portion of the road with a grade higher than a threshold grade.

BRIEF DESCRIPTION OF THE DRAWINGS

FIG. 4 is an illustration of an example route on which the vehicle of FIG. 1 can travel on.

FIGS. 5 and 6 are example illustrations of a visual output of the braking controller of FIGS. 1-3.

Figure 1:
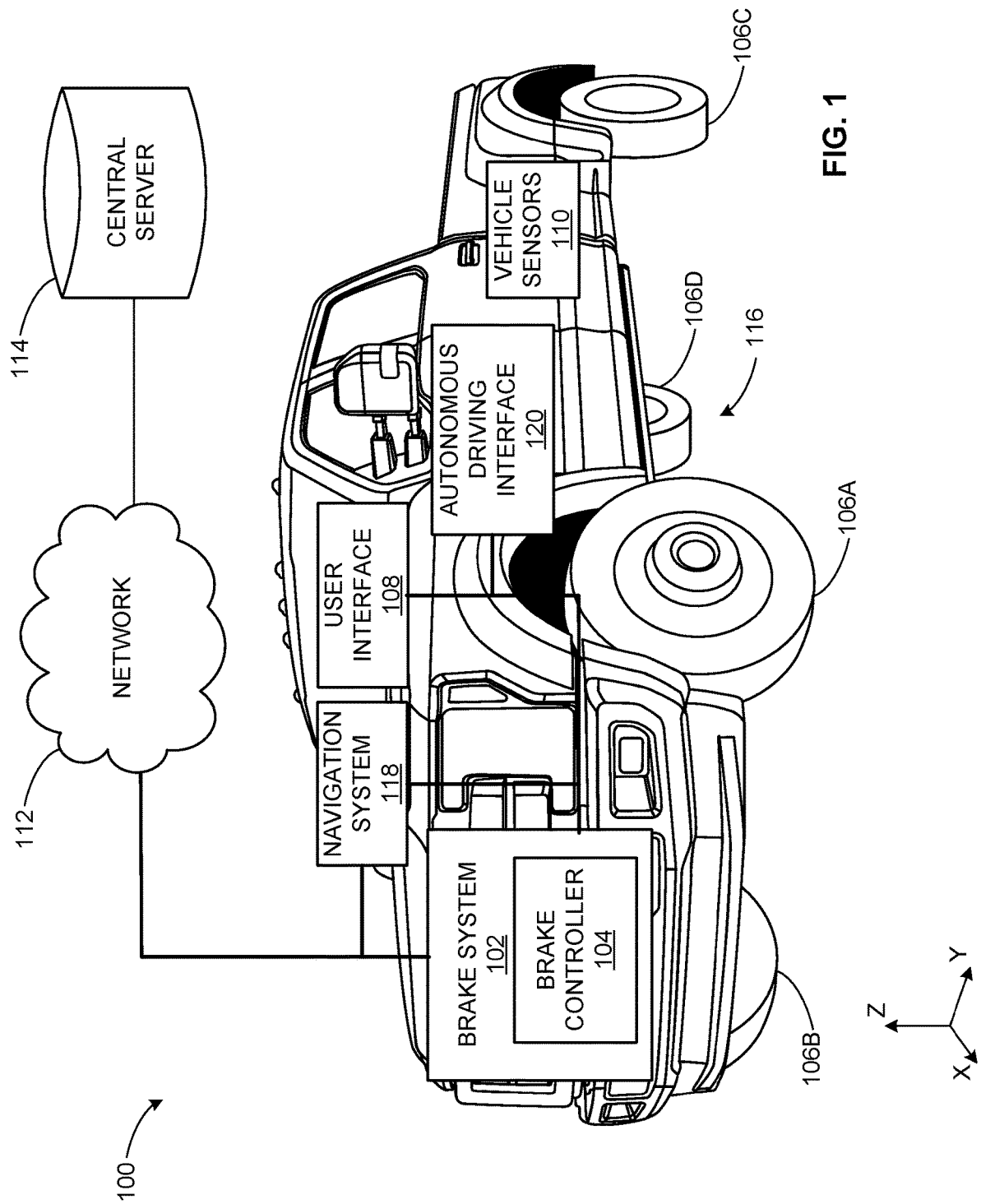
FIG. 1 is a perspective view of a vehicle in which examples disclosed herein can be implemented.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

DETAILED DESCRIPTION

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, the orientation of features is described with reference to a lateral axis, a vertical axis, and a longitudinal axis of the vehicle associated with the features. As used herein, the longitudinal axis of the vehicle is parallel to a centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. The terms "below" and "above" are used to refer to directions along the vertical axis closer to the ground and away from the ground, respectively. As used herein, the lateral axis of the vehicle is perpendicular to the longitudinal and vertical axes and is generally parallel to the axles of the vehicle. As used herein, the terms "longitudinal," and "axial" are used interchangeably to refer to directions parallel to the longitudinal axis. As used herein, the terms "lateral" and "horizontal" are used to refer to directions parallel to the lateral axis. As used herein, the term "vertical" is used interchangeably to refer to directions parallel to the vertical axis.

Vehicle brakes often include brake pads disposed on a caliper of the brake. In some examples, brake pads are composed of a rigid backplate and a friction pad coupled thereto. In some such examples, when the brakes are engaged, the caliper is actuated towards the rotor, causing the brake pad to contact the rotor. The friction between the brake pad and a rotor converts the kinetic energy of the rotating rotor into thermal energy, thereby slowing the rotation of the vehicle. Over the service life of a brake pad, the friction pad is gradually worn due to the contact with the rotor, reducing the effectiveness of the brakes and potentially causing damage to the rotor and/or caliper as a result of contact between the backplate and the rotor. Additionally, throughout a trip, repeated and heavy brake engagement can cause excessive heat build-up in brake components, which can reduce the effectiveness of the brakes (e.g., brake fade, etc.).

In recent years, battery-powered electric vehicles (BEV) have become more common and capable, enabling BEVs to tow larger and heavier loads. In some situations, these high loads can result in higher duty cycles and temperatures on the brakes of these vehicles (e.g., frictional brakes, regenerative brakes, etc.). Some BEVs include electric brake boosters (EBB) to assist users of the vehicles in applying the necessary brake force to sufficiently slow the vehicle. Like vacuum brake boosters, EBBs include gear unit(s) that convert torque from an electric motor into hydraulic pressure for the brake. EBBs can detect the actuation of the brake pedal via an integrated differential travel sensor and generate a power request for the electric motor. Additionally, brake-by-wire systems enable the displacement of the brake pedal to be used to directly control the deceleration rate of a vehicle, instead of relying on hydraulic pressure like conventional systems.

While EBBs and brake-by-wire systems ensure that the brakes of vehicles are responsive to user commands, the direct coupling of user input to vehicle deceleration can prevent a user of the vehicle from perceiving if the performance of the brakes of the vehicle have degraded. That is, instead of needing to apply additional pressure on the brake pedal, a system/component of the vehicle can compensate for brake degradation by applying more brake pressure via the EBB and/or other brake components. As such, in the event of excessive brake fade from overheating and/or other types of brake-related faults, a user of the vehicle cannot detect this degradation via feedback from the brake pedal and the deceleration of the vehicle.

Examples disclosed herein overcome the above-noted deficiencies and include a brake capability and response system. Examples disclosed herein include a vehicle that continuously conducts brake health check events to determine if the vehicle brake system is capable of decelerating the vehicle at a pre-determined deceleration rate. In some examples disclosed herein, these brake health check events occur while the vehicle is on a relatively high grade and prior to such high grade road portions. In some such examples disclosed herein, a pre-grade brake health check events occurs prior to the last highway exit before the high grade road portion to ensure the vehicle is able to exit the highway if required. In some examples, the frequency and/or fidelity of the brake health checks events are based on properties of the route of the vehicle, the current degradation/derate of the vehicle brakes, the load on the vehicle, the environmental conditions of the vehicle, and/or user preferences.

Examples disclosed herein determine the health of the brakes based on the temperature of brake components and/or the relationship between the actual deceleration rate of the vehicle and the expected deceleration rate (e.g., based on the pressure of the brake line, etc.). In some such examples disclosed herein, if the vehicle includes friction brakes, the system can determine the derate of the brake system based on the temperature of the calipers, the rotors, the booster, etc. In some such examples disclosed herein, if the vehicle includes regenerative brakes, the system can determine derate of the brake system based on the temperature of the electric motor, the inverter systems controller (ISC), the insulated-gate bipolar transistors (IGBT), etc. In some examples disclosed herein, a braking controller of the vehicle can compare the deceleration rate of the vehicle and/or brake torque to one or more threshold(s) to estimate the magnitude of the brake performance derate/degradation.

Some examples disclosed herein utilize the navigation system to locate the presence of runaway truck ramps. In some examples disclosed herein, if the system determines that the brake performance no longer satisfies a first threshold deceleration rate while the vehicle is on a relatively steep grade, the system can cause the vehicle to navigate to a lane associated with the runaway truck ramp. In some such examples disclosed herein, if the system determines that the brake performance does not satisfy a second threshold deceleration rate while the vehicle is still on the relatively steep grade, the system can cause the vehicle to navigate onto the runaway truck ramp to ensure the vehicle is able to slow and allow the brake system to cool.

FIG. 1 is a perspective view of a vehicle 100 in which examples disclosed herein can be implemented. In the illustrated example of FIG. 1, the vehicle 100 includes an example brake system 102, an example brake controller 104, an example first wheel 106A, an example second wheel 106B, an example third wheel 106C, and an example fourth wheel 106D. In the illustrated example of FIG. 1, the vehicle 100 includes an example user interface 108 and example vehicle sensors 110. In the illustrated example of FIG. 1, the vehicle 100 is connected, via an example network 112, to an example central server 114. In the illustrated example of FIG. 1, the vehicle 100 includes an example powertrain 116, an example navigation system 118, and an example autonomous driving interface 120.

The vehicle 100 is a motorized wheel-driven vehicle. In the illustrated example of FIG. 1, the vehicle 100 is a pick-up truck. In other examples, the vehicle 100 can be any type of vehicle with brakes (e.g., a sedan, a coupe, a van, a pick-up truck, a sports utility vehicle, an all-terrain vehicle (ATV), farming equipment, etc.). In some examples, the vehicle 100 includes an internal combustion engine (e.g., a non-electrified vehicle, a partially electrified vehicle, etc.). In other examples, the vehicle 100 can be implemented as a fully electric vehicle. In some examples, the vehicle 100 can be a fully autonomous vehicle and/or a partially autonomous vehicle.

The brake system 102 includes mechanical and electrical components that retard the rotation of the wheels 106A, 106B, 106C, 106D. The brake system 102 can receive user input (e.g., via the user interface 108, etc.) and cause activation of one or more brake(s) of the brake system 102. While the brake system 102 is described herein as a friction disc brake system, the examples described herein can also be applied to any other suitable type of brake system (e.g., a drum brake system, a dual disc-drum brake system, a clasp brake system, band brake systems, electromagnetic brakes, etc.). In some examples, the brake system 102 can include regenerative braking components. Similarly, while the brake system 102 described herein is a hydraulic system, the examples described herein can also be applied to brake-by-wire and/or hybrid brake systems. An example implementation of the brake system 102 is described in greater detail below in FIG. 2.

The wheels 106A, 106B, 106C, 106D include a wheel rim and a corresponding tire. While in the illustrated example of FIG. 1, the vehicle 100 has two axles and four wheels, in other examples, the vehicle 100 can have any number of axles and wheels. In the illustrated example of FIG. 1, the first wheel 106A and the second wheel 106B are front wheels and the third wheel 106C and the fourth wheel 106D are rear wheels. In the illustrated example of FIG. 1, the first wheel 106A and the third wheel 106C are driver-side wheels and the second wheel 106B and the fourth wheel 106D are passenger-side wheels.

The user interface 108 enables a user of the vehicle 100 to receive and input information to the brake system 102 and other systems of the vehicle 100. For example, the user interface 108 can include a display of the vehicle 100. In some examples, the user interface 108 can include an interface to operate the brake system 102 during operation of the vehicle 100 (e.g., a brake pedal, a hand lever, etc.). In some examples, the user interface 108 can receive instructions, warnings, and/or alerts from the brake controller 104 regarding the status of the brake system 102. Additionally or alternatively, the user interface 108 can include one or more dash indicator(s), one or more button(s) on the dashboard or steering wheel, one or more speakers, one or more microphones, etc. In some examples, the user interface 108 can be fully or partially implemented by a mobile device of the user (e.g., a mobile phone, a smartwatch, a tablet, etc.).

During the operation of the vehicle 100, the brake system 102 is controlled via the brake controller 104. For example, in response to a user input (e.g., the depression of a brake pedal, etc.) and/or an automated input (e.g., the vehicle 100 detecting an imminent obstacle in front of the vehicle 100, etc.), the brake controller 104 can cause the brake system 102 to retard the rotation of some or all of the wheels 106A, 106B, 106C, 106D, thereby slowing the vehicle 100. In some examples, the brake system 102 can determine the derate level of the brake system 102 based on data collected by the vehicle sensors 110 and/or sensor(s) associated with the wheels 106A, 106B, 106C, 106D. In some examples, the brake controller 104 can, via the user interface 108, alert a user of the vehicle 100 of the status of the brake system 102 (e.g., the temperature, the derate level, the braking capability, the service life, etc.) and user mitigation actions. The brake controller 104 is described in greater detail below in FIGS. 2 and 3.

The network 112 enables communications between the vehicle 100 (e.g., the brake controller 104, etc.) and other network entities (e.g., the central server 114, other vehicles, etc.). In some examples, the network 112 can be implemented as a cellular network, the internet, or any other suitable wide area network (WAN). In other examples, the network 112 can be a wired connection. In some such examples, the vehicle 100 can interface with the central server 114 via a wired connection (e.g., the vehicle 100 can be connected while the vehicle 100 is being serviced, etc.). In some examples, the network 112 can be implemented via multiple networks (e.g., a local area network coupled to a wide area network, etc.).

The central server 114 is a server that stores information relating to the vehicle 100. For example, the central server 114 can include performance data relating to the vehicle 100 and other vehicles similar to the vehicle 100. In some examples, the vehicle 100 can transmit data, via the network 112, to the central server 114 relating to the performance of the brake system 102 and related vehicle parameters (e.g., vehicle loading, environmental conditions, etc.). Additionally or alternatively, the central server 114 can transmit information to the brake controller 104 relating to the thermal model and/or thresholds related to the components of the brake system 102. In some examples, the central server 114 is maintained by a manufacturer of the vehicle 100 and/or a manufacturer of the brake components of the brake system 102. Additionally or alternatively, the central server 114 can be maintained by any other suitable entity (e.g., an insurance company, a government entity, a third-party agency, etc.). In some examples, the network 112 and/or the central server 114 can be absent. In some such examples, the brake controller 104 determines derate information via locally generated/stored information (e.g., stored by a user of the vehicle 100, stored by a manufacturer of the vehicle 100, etc.).

In the illustrated example of FIG. 1, the vehicle powertrain 116 is an electrified powertrain. For example, the vehicle powertrain 116 includes a plurality of batteries, electric motors and related systems. Additionally or alternatively, the vehicle powertrain 116 can include a combustion engine. In the illustrated example of FIG. 1, the vehicle powertrain 116 provides power to the brake system 102 (e.g., a booster of the brake system, the motor of a brake-by-wire system, etc.) Additionally or alternatively, if the brake system 102 includes regenerative braking components, the brake system 102 can provide power to charge the batteries associated with the vehicle powertrain 116.

The navigation system 118 is a computing system that aids in the navigation of the vehicle 100. For example, the navigation system 118 can be a global position system (GPS) that determines the location of the vehicle 100 on a road. In some examples, the navigation system 118 can determine a fastest and/or most efficient route for the vehicle 100 to travel to get to a target destination (e.g., input via the user interface 108, etc.). In some examples, the navigation system 118 can be fully or partially implemented by a mobile device of the user (e.g., a mobile phone, a smartwatch, a tablet, etc.). In some examples, the navigation system 118 can be implemented by a stand-alone dedicated GPS device.

The autonomous driving interface 120 interfaces an autonomous driving system of the vehicle 100 with other systems of the vehicle 100. For example, the vehicle 100 can include a system that enables the vehicle 100 to drive without and/or with reduced input from an operator of the vehicle 100 (e.g., a fully self-driving system, a partially self-driving system, etc.). In such examples, the autonomous driving interface 120 enables the autonomous driving system to receive data from the vehicle sensors 110, the wheel sensors 208A, 208B, 208C, 208D (FIG. 2) and/or the user interface 108 and to send commands to the brake controller 104, the steering system of the vehicle 100, the powertrain 116, etc. In some examples, the autonomous driving interface 120 and/or the autonomous driving system can be absent.

Figure 2:
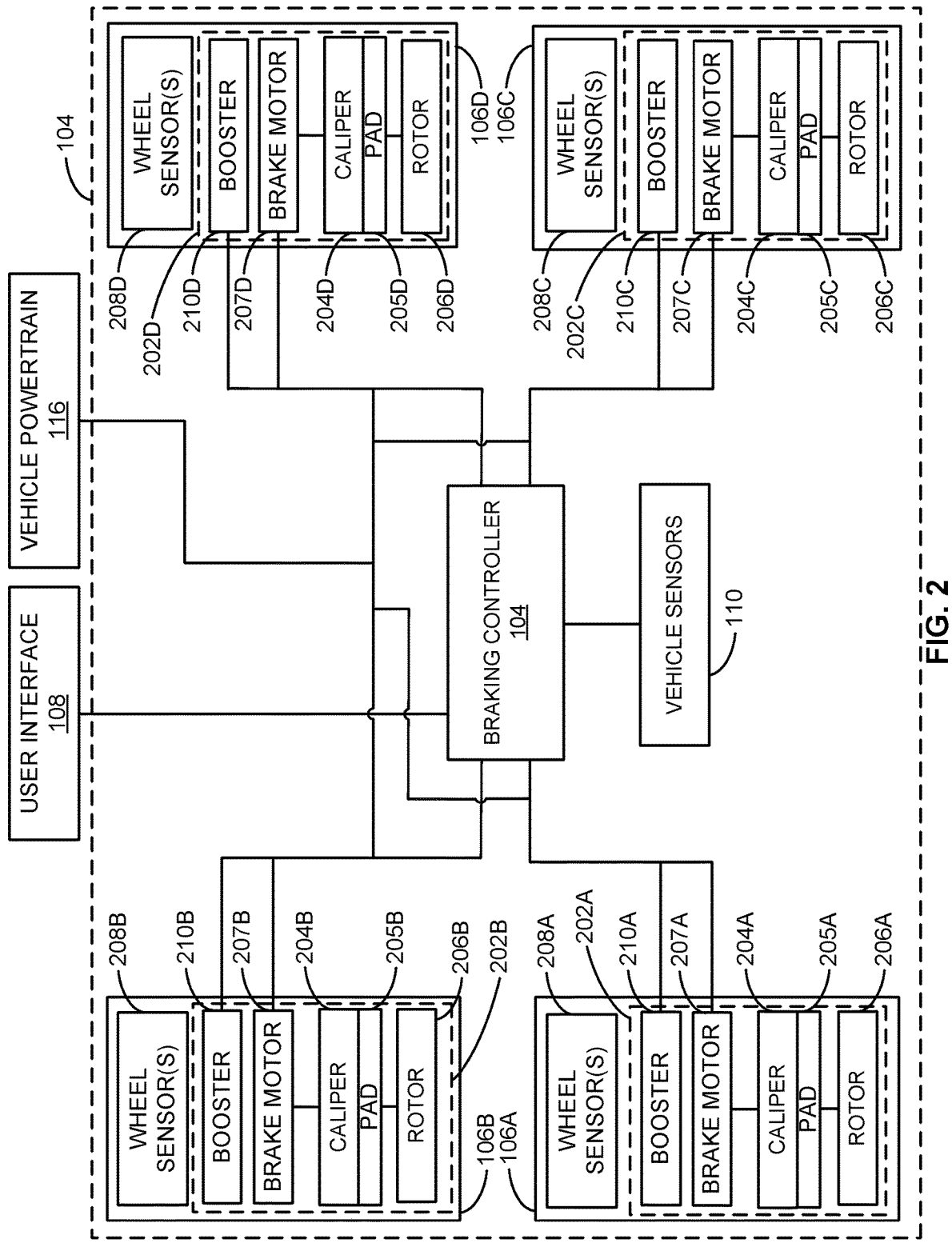
FIG. 2 is a system diagram of the brake system of FIG. 1.

FIG. 2 is a system diagram of the brake system 102 of FIG. 1. In the illustrated example of FIG. 2, the brake system 102 includes the example brake controller 104 of FIG. 1. In the illustrated example of FIG. 2, the brake system 102 includes an example first brake 202A, an example second brake 202B, an example third brake 202C, and an example fourth brake 202D, which are associated with the first wheel 106A, the second wheel 106B, the third wheel 106C, and the fourth wheel 106D, respectively. In the illustrated example of FIG. 2, the first brake 202A includes an example first caliper 204A, an example first brake pad 205A, an example first rotor 206A, and an example first brake motor 207A. In the illustrated example of FIG. 2, the second brake 202B includes an example second caliper 204B, an example second brake pad 205B, an example second rotor 206B, and an example second brake motor 207B. In the illustrated example of FIG. 2, the third brake 202C includes an example third caliper 204C, an example third brake pad 205C, an example third rotor 206C, and an example third brake motor 207C. In the illustrated example of FIG. 2, the fourth brake 202D includes an example fourth caliper 204D, an example fourth brake pad 205D, an example fourth rotor 206D, and an example fourth brake motor 207D. In the illustrated example of FIG. 2, the brake system 102 includes example first wheel sensors 208A, example second wheel sensors 208B, example third wheel sensors 208C, example fourth wheel sensors 208D, which are associated with the wheels 106A, 106B, 106C, 106D, respectively. In the illustrated example of FIG. 2, the brakes 202A, 202B, 202C, 202D include an example first brake booster 210A, an example second brake booster 210B, an example third brake booster 210C, and an example fourth brake booster 210D.

The brake controller 104 controls the brakes 202A, 202B, 202C, 202D of the vehicle 100. For example, the brake controller 104 can cause the calipers 204A, 204B, 204C, 204D to engage the corresponding ones of the rotors 206A, 206B, 206C, 206D during the operation of the vehicle 100 (e.g., to bring the vehicle 100 from a velocity to a stop, to hold the vehicle, etc.). In some examples, the brake controller 104 communicates with the calipers 204A, 204B, 204C, 204D via a controller area network (CAN) bus of the vehicle 100. Additionally or alternatively, the brake controller 104 can communicate with the calipers 204A, 204B, 204C, 204D via an independent communication system (e.g., an electrical communication system, a hydraulic communication system, etc.). The brake controller 104 can be implemented by an electronic control unit of the vehicle 100 (e.g., a dedicated brake control module (BCM), one or more vehicle control module(s) (VCM), one or more domain controller(s), etc.). In other examples, some or all of the components of the brake controller 104 can be implemented by one or more other system(s) of the vehicle 100 (e.g., the anti-lock brake system (ABS), the electronic stability system (ESC), a powertrain controller, a transmission controller, etc.).

The calipers 204A, 204B, 204C, 204D are mechanical components that receive inputs from the brake controller 104. In some examples, if the brake system is a brake-by-wire system, after receiving an input (e.g., a braking signal, etc.) from the brake controller 104, the brake motors 207A, 207B, 207C, 207D can cause the calipers 204A, 204B, 204C, 204D to apply a clamping pressure (e.g., via one or more pistons, etc.) to a respective one of the rotors 206A, 206B, 206C, 206D. Additionally or alternatively, if the brake system is a conventional hydraulic system and the brake motors 207A, 207B, 207C, 207D are absent, the force applied by a user of the vehicle 100 (e.g., via a brake pedal, etc.) is converted into hydraulic pressure used to press the calipers 204A, 204B, 204C, 204D, and, thus, the brake pads 205A, 205B, 205C, 205D into the rotors 206A, 206B, 206C, 206D. Regardless of the braking mechanism, the application of the calipers 204A, 204B, 204C, 204D, slows the rotation of the corresponding one of the wheels 106A, 106B, 106C, 106D. The brake pads 205A, 205B, 205C, 205D are designed to abrade on contact with the rotors 206A, 206B, 206C, 206D, thereby preventing damage, deformation, and/or warping to the rotors 206A, 206B, 206C, 206D and the calipers 204A, 204B, 204C, 204D.

The rotors 206A, 206B, 206C, 206D are discs that are connected to the wheels 106A, 106B, 106C, 106D, respectively. The rotors 206A, 206B, 206C, 206D are rigidly connected to and rotate with the wheels 106A, 106B, 106C, 106D. During operation of the brakes 202A, 202B, 202C, 202D, the calipers 204A, 204B, 204C, 204D via the brake pads 205A, 205B, 205C, 205D apply a frictional force to the rotors 206A, 206B, 206C, 206D, thereby slowing the rotation of the corresponding one of the wheels 106A, 106B, 106C, 106D.

The wheel sensors 208A, 208B, 208C, 208D are associated with the respective ones of the wheels 106A, 106B, 106C, 106D to measure characteristics associated with the wheels 106A, 106B, 106C, 106D, and the brakes 202A, 202B, 202C, 202D. For example, the wheel sensors 208A, 208B, 208C, 208D can include sensors that measure the force and/or pressure applied by the calipers 204A, 204B, 204C, 204D. In some examples, the wheel sensors 208A, 208B, 208C, 208D include one or more thermometers that measure the temperature of the brake components (e.g., the calipers, the rotors, the motors, the pads, etc.). Additionally or alternatively, the wheel sensors 208A, 208B, 208C, 208D can include any other suitable sensors.

The boosters 210A, 210B, 210C, 210D are devices that increase the torque applied by the calipers 204A, 204B, 204C, 204D onto the rotors 206A, 206B, 206C, 206D. The boosters 210A, 210B, 210C, 210D reduce the amount of force that a driver must apply to the brake pedal to sufficiently slow a vehicle 100 (e.g., serve a similar function that a power steering system serves for the vehicle steering system, etc.). The brake controller 104 can detect an actuation of the brake pedal (e.g., via an integrated differential travel sensor of the vehicle sensors 110, etc.), which in turn generates a command signal to the boosters 210A, 210B, 210C, 210D to increase the applied brake torque. The brake controller 104 can use feedback from the actual deceleration rate of the vehicle 100 to ensure an appropriate amount of additional wheel torque is supplied by the boosters 210A, 210B, 210C, 210D. That is, the brake controller 104 can use the boosters 210A, 210B, 210C, 210D to achieve a driver's desired deceleration (e.g., detected via the travel of the brake pedal, etc.). If the brakes 202A, 202B, 202C, 202D are experiencing brake fade (e.g., the brake pads 205A, 205B, 205C, 205D are overheated, etc.), the boosters 210A, 210B, 210C, 210D will supply a disproportionate amount of additional wheel torque, thereby preventing a driver of the vehicle 100 from detecting the brake fade.

In the illustrated example of FIG. 2, the boosters 210A, 210B, 210C, 210D are electric brake boosters. In other examples, the boosters 210A, 210B, 210C, 210D can be any suitable type of brake boosters (e.g., vacuum boosters, hydraulic brake boosters, etc.) In some examples, the boosters 210A, 210B, 210C, 210D are absent (e.g., the system is a steer-by-wire system, etc.). In such examples, the brake motors 207A, 207B, 207C, 207D can similarly compensate for derate of the brake components by increasing the applied brake torque to achieve a target deceleration rate, thereby preventing the driver from noticing brake fade.

The vehicle sensors 110 measure the properties of the vehicle 100. For example, the vehicle sensors 110 can include sensors that determine a load on the vehicle 100 (e.g., ride height sensors, strain gauges, optical sensors, etc.). The vehicle sensors 110 can include one or more sensors to measure the temperatures of the components of the brake system 102. The vehicle sensors 110 can include pressure sensors that measure the pressure in the brake lines of the brake system 102 in examples using hydraulic fluid to convey braking forces.

During normal service of the vehicle 100, the operation of the brakes 202A, 202B, 202C, 202D is controlled via the user interface 108 and the brake controller 104. For example, the brake controller 104 can receive user inputs (e.g., the depression of a brake pedal, etc.). In some examples, the brake controller 104 causes engagement of the first brake 202A by communicating (e.g., via a wired connection, via a wireless connection, etc.) with the first brake motor 207A that drives the first caliper 204A to press the brake pad 205A against the first rotor 206A. The resulting friction between the brake pad 205A and the first rotor 206A slows (e.g., decelerates, stops, etc.) the rotation of the first wheel 106A. Additionally or alternatively, the other wheels 106B, 106C, 106D and corresponding ones of the brakes 202B, 202C, 202D can be similarly engaged by the brake controller 104 via the user interface 108. In some examples, the brake controller 104 can periodically conduct brake health check events by actuating the brakes 202A, 202B, 202C, 202D. In some examples, the brake controller 104 can conduct brake health check events the brakes are engaged during normal operation of the vehicle 100. In other examples, the brake controller 104 can initiate brake health checks independently of a user input.

Figure 3:
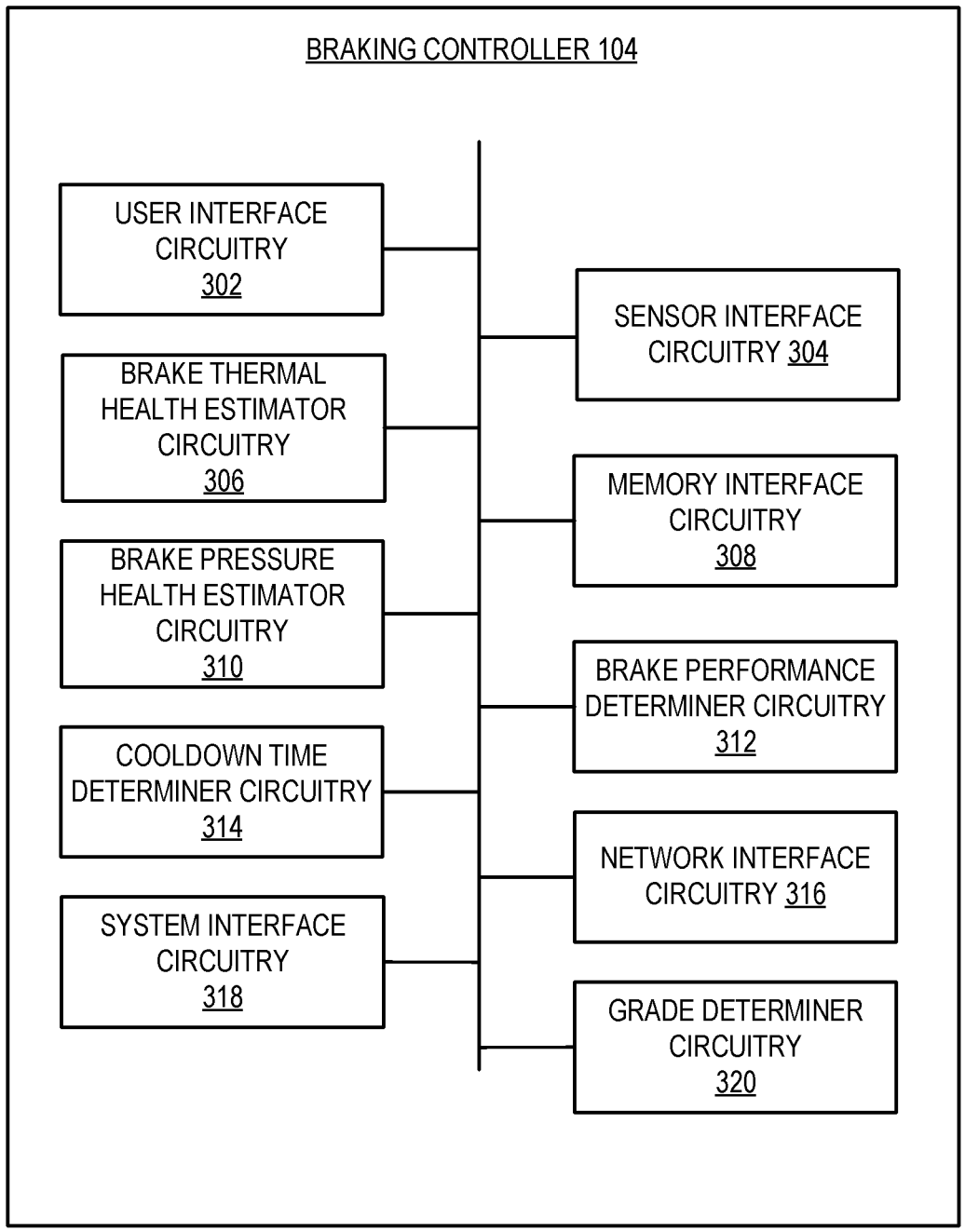
FIG. 3 is a block diagram of the brake controller of FIGS. 1 and 2.

FIG. 3 is a block diagram of the brake controller 104 of FIGS. 1 and 2. In the illustrated example of FIG. 3, the brake controller 104 includes example user interface circuitry 302, example sensor interface circuitry 304, example brake thermal health estimator circuitry 306, example memory interface circuitry 308, example brake pressure health estimator circuitry 310, example brake performance determiner circuitry 312, example cooldown time determiner circuitry 314, example network interface circuitry 316, example system interface circuitry 318, and example grade determiner circuitry 320.

The user interface circuitry 302 receives inputs from the user interface 108 of FIG. 1. For example, the user interface circuitry 302 can cause the user interface 108 to present a visual, audio, and/or haptic alert. The user interface circuitry 302 can generate and/or modify a graphical user interface (GUI). An example graphical user interface implemented in accordance with the teachings of this disclosure is described below in conjunction with FIG. 5. In other examples, the user interface circuitry 302 can alert a user of the vehicle 100 by any other suitable means. In some examples, the user interface circuitry 302 can receive a command and/or indication to initiate a brake health check event. For example, the user interface circuitry 302 can generate a brake health check event in response to a triggering condition (e.g., an upcoming exit prior to a steep grade, etc.). Additionally or alternatively, brake health check events can be generated periodically (e.g., based on environmental conditions, based on the current derate status of the brake system 102, based on a make/model of the vehicle 100, based on a load of the vehicle 100, etc.).

The sensor interface circuitry 304 receives sensor data from the sensors 208A, 208B, 208C, 208D, 110 of the example vehicle 100 and/or brake system 102. In some examples, the sensor interface circuitry 304 can transform the received sensor data from a machine-readable format (e.g., a voltage, a current, etc.) to a human-readable format (e.g., a string, a floating-point number, an integer, etc.).

The brake thermal health estimator circuitry 306 can estimate the brake component derate based on the temperature model and current temperature(s) of the brake components. For example, the brake thermal health estimator circuitry 306 can use a thermal model and/or a look-up table retrieved by the memory interface circuitry 308 to determine the derate of individual brake components (e.g., the information associated with the components 506A, 506B, 506C, 506D, 506E of FIG. 5, etc.). In such examples, the brake thermal health estimator circuitry 306 can use the current temperature of the individual brake components, the ambient temperature, etc. as inputs into the thermal model and/or look-up table.

The memory interface circuitry 308 interfaces with (e.g., stores, accesses, etc.) information associated with the brake controller 104. For example, the memory interface circuitry 308 can interface with a memory associated with the vehicle 100 (e.g., the local memory 1116 of FIG. 11, the volatile memory 1114 of FIG. 11, the non-volatile memory 1116 of FIG. 11, the mass storage 1128 of FIG. 11, etc.). The memory interface circuitry 308 can access a temperature model associated with the vehicle 100. In other examples, the memory interface circuitry 308 can (e.g., via the network interface circuitry 316, etc.) access the temperature model via the network 112 (e.g., from a manufacturer of the vehicle 100, etc.).

The brake pressure health estimator circuitry 310 can estimate the brake component derate based on the pressure of the brake lines, the actual deceleration rate of the vehicle 100, and the expected deceleration rate of the vehicle 100. In some examples, the brake pressure health estimator circuitry 310 can determine the actual deceleration rate and/or the expected deceleration based on a total weight of the vehicle 100 and/or any coupled trailer (e.g., via ride height sensor data, via hitch instrumentation, via a relationship between acceleration and applied brake torque, via a user input, etc.). In some examples, the brake pressure health estimator circuitry 310 can determine the brake line pressure based on sensor data received by the sensor interface circuitry 304. Additionally or alternatively, the brake pressure health estimator circuitry 310 can estimate the brake line pressure based on the travel of the brake pedal and/or any other suitable metrics. In some such examples, the brake pressure health estimator circuitry 310 determines the deceleration rate. For example, the brake pressure health estimator circuitry 310 can determine the actual deceleration rate of the vehicle 100 via sensor data received by the sensor interface circuitry 304.

The brake pressure health estimator circuitry 310 estimates the brake component health derate based on the comparison of the deceleration rate and the expected deceleration rate. For example, the brake pressure health estimator circuitry 310 can determine the relationship of the actual deceleration rate to the expected deceleration. In some examples, if the actual deceleration rate is substantially equal to the expected deceleration rate, the brake pressure health estimator circuitry 310 can estimate the brake system 102 is not derated. In some examples, if the actual deceleration rate is substantially below the expected deceleration rate, the brake pressure health estimator circuitry 310 can determine the magnitude of the brake component health derate based on the comparison.

The brake performance determiner circuitry 312 estimates the system derate based on the brake component health. For example, the brake performance determiner circuitry 312 can estimate an overall system derate based on the output of the brake pressure health estimator circuitry 310 and/or the brake thermal health estimator circuitry 306. In some examples, the brake performance determiner circuitry 312 can determine the health of the brake system 102 as a function of the deceleration capability of the vehicle 100. For example, the brake performance determiner circuitry 312 can determine an actual deceleration capability as a function of a required deceleration capability (e.g., a percentage of the required deceleration capability, etc.). In other examples, the brake performance determiner circuitry 312 can determine the overall performance of the brake system 102 by any other suitable means.

The cooldown time determiner circuitry 314 determines the brake cooldown time. For example, the cooldown time determiner circuitry 314 can estimate the amount of time required for the components of the brake system with high derate levels to cool to normal operating temperatures. In some examples, the cooldown time determiner circuitry 314 can calculate the required time based on an ambient temperature of the vehicle 100, the temperature of the components, and/or a thermal model associated with the brake components. In some examples, the brake thermal health estimator circuitry 306 can apply a margin (e.g., 10%, 50%, etc.) to the calculated cooldown time to ensure that the brake system 102 sufficiently cools prior to continued operation by the driver. Additionally or alternatively, the cooldown time determiner circuitry 314 can estimate the required cooldown time by any other suitable means.

The network interface circuitry 316 interfaces the vehicle 100 with the network 112. For example, the network interface circuitry 316 can connect the vehicle 100 to the central server 114 to allow the vehicle 100 to send brake health events. Additionally or alternatively, the network interface circuitry 316 can enable the brake controller 104 to access information from the central server 114.

The system interface circuitry 318 interfaces with the components of the brake system (e.g., the brakes 202A, 202B, 202C, 202D to cause the activation of the calipers 204A, 204B, 204C, 204D, the boosters 210A, 210B, 210C, 210D, etc.), the navigation system 118, the autonomous driving interface 120, and/or other vehicle systems. In some examples, the system interface circuitry 318 can cause the vehicle 100 to navigate to a particular location via the autonomous driving interface 120.

The grade determiner circuitry 320 determines the grade of the portion of the route on which the vehicle 100 is disposed. For example, the grade determiner circuitry 320 determines the magnitude of the grade the vehicle is on via sensor data from the vehicle sensors 110 (e.g., a sensor associated with a safety system of the vehicle 100, an optical sensor, etc.). Additionally or alternatively, the grade determiner circuitry 320 can determine the grade based on route information from the navigation system 118. In some examples, the grade determiner circuitry 320 can compare the determined grade to a threshold grade to determine if the vehicle 100 needs to take additional mitigation efforts to compensate for the derated status of the brake system 102. In some examples, the threshold grade can be set by a user of the vehicle 100 and/or a manufacturer of the vehicle 100. In other examples, the threshold grade can be determined based on a load of the vehicle 100, the environmental conditions (e.g., the weather conditions, the external temperature, etc.) and/or any other suitable metric.

While an example manner of implementing the brake controller 104 of FIGS. 1 and 2 is illustrated in FIG. 3, one or more of the elements, processes, and/or devices illustrated in FIG. 3 may be combined, divided, re-arranged, omitted, eliminated, and/or implemented in any other way. Further, the example brake thermal health estimator circuitry 306, the example memory interface circuitry 308, the example brake pressure health estimator circuitry 310, the example brake performance determiner circuitry 312, the example cooldown time determiner circuitry 314, the example network interface circuitry 316, the example system interface circuitry 318, example grade determiner circuitry 320, and/or, more generally, the example brake controller 104 of FIGS. 1-3, may be implemented by hardware alone or by hardware in combination with software and/or firmware. Thus, for example, any of the example brake thermal health estimator circuitry 306, the example memory interface circuitry 308, the example brake pressure health estimator circuitry 310, the example brake performance determiner circuitry 312, the example cooldown time determiner circuitry 314, the example network interface circuitry 316, the example system interface circuitry 318, example grade determiner circuitry 320, and/or, more generally, the example brake controller 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example brake controller 104 of FIGS. 1 and 2 may include one or more elements, processes, and/or devices in addition to, or instead of, those illustrated in FIG. 3, and/or may include more than one of any or all of the illustrated elements, processes and devices.

Figure 4:
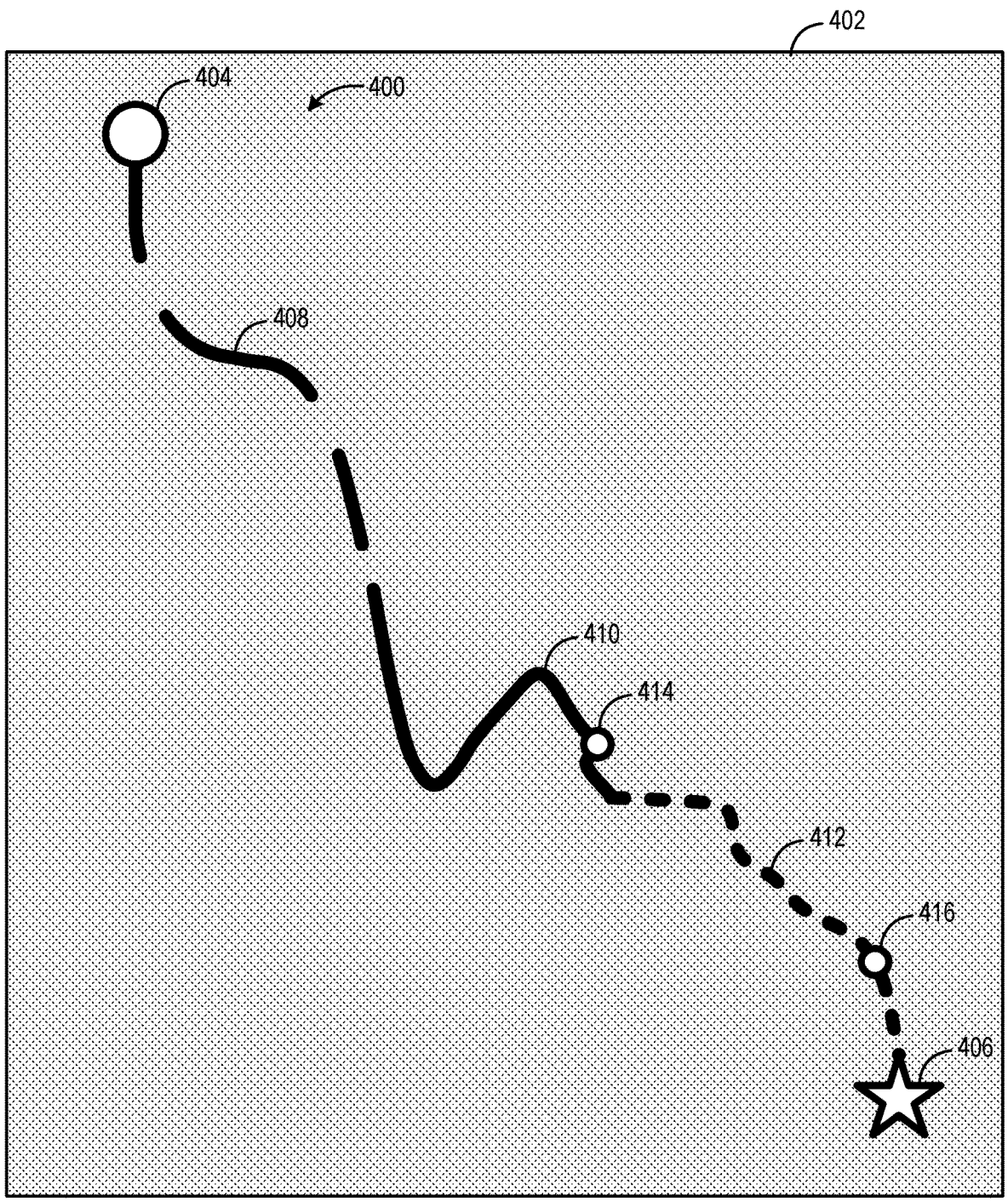

FIG. 4 is an illustration of an example route 400 along which the vehicle 100 of FIG. 1 can travel. In the illustrated example of FIG. 4, the route 400 takes place in an example road network 402. In the illustrated example of FIG. 4, the route 400 has an example route start 404, an example route end 406, an example first route portion 408, an example second route portion 410, and an example third route portion 412. The route 400 includes an example first location 414 and an example second location 416.

The route 400 can be generated by the navigation system 118 based on a user input. For example, the route 400 can be automatically generated by the navigation system 118 in response to a user of the vehicle 100 inputting the route end 406 (e.g., the destination of the driver, etc.) and the route start 404 (e.g., the current location of the vehicle 100, etc.). In some examples, the route 400 can be generated (e.g., the selection of the specific roads of the route 400, etc.) based on a user preference (e.g., avoiding grades, avoiding tolls, etc.), the current derate condition of the brake system 102, the load on the vehicle 100, the environment of the road network 402, and/or any other suitable metrics. In the illustrated example of FIGS. 4, 7, and 8, the route 400 is primarily along a three-lane highway with a plurality of exits (not illustrated in FIG. 4) and/or locations to stop (not illustrated) (e.g., rest stops, pull-off areas, etc.). In other examples, the route 400 can be along any other suitable type roadway.

The route 400 includes the road portions 408, 410, 412. The first portion 408 has a comparatively medium grade (e.g., a medium grade, etc.), the second portion 410 has a comparatively low grade (e.g., a minimal grade, etc.), and the third portion 412 has a comparatively high grade (e.g., an excessive grade, a steep grade, etc.). In the illustrated example of FIG. 4, the comparative magnitude of the grades of the portions 408, 410, 412 is represented via a frequency of dashed lines (e.g., the comparatively high grade of the third portion 412 has more dashes than the comparatively low grades of the first portion 408 and the second portion 410, etc.).

As the vehicle 100 travels along the route 400, the vehicle 100 begins at the route start 404 and travels along the mild grade associated with the first portion 408. After the first portion 408, the vehicle 100 travels along the minimal grade of the second portion 410. After the second portion 410, the vehicle 100 travels along the comparatively high grade of the third portion 412. While traveling along the route 400, the vehicle 100 uses the brake system 102, which can cause the brake system 102 to heat. In some such examples, excessive heating of the brake system 102 can cause brake fade and an associated derate of the brake system 102. If the brake system 102 has a high level of derate on portions of the route with a comparatively high grade (e.g., the first portion 408, the third portion 412, etc.), the vehicle 100 may not be able to effectively decelerate, thereby reducing the control of the vehicle 100 by the driver.

The first location 414 corresponds to the location of the last opportunity of the vehicle 100 to leave the route 400 (e.g., take another road of the road network 402, etc.) prior to the third portion 412. If the deceleration capability of the brake system 102 does not satisfy a deceleration threshold, the brake controller 104 can issue an alert for a user of the vehicle 100 to take the exit and allow the brake system 102 to cool. Additionally or alternatively, the brake controller 104, via the autonomous driving interface 120, can cause the vehicle 100 to exit the route 400 via the exit associated with the first location 414. The first location 414 is described in additional detail below in conjunction with FIG. 7.

FIG. 5 is an illustration of an example visual output 500 of the brake controller 104 of FIGS. 1-3. In the illustrated example of FIG. 5, the visual output 500 includes an example first column 502 that corresponds to the components of the brake system 102 and an example second column 504 that corresponds to an amount of derate of the components. In the illustrated example of FIG. 5, the first column 502 includes an example first component 506A ('brake pads'), an example second component 506B ('brake rotor'), an example third component 506C ('motor'), an example fourth component 506D ('ISC'), and an example fifth component 506E ('battery.') In the illustrated example of FIG. 5, the second column 504 includes an example first derate level 508A ('6'), an example second derate level 508B ('3'), an example third derate level 508C ('0'), an example fourth derate level 508D ('0'), and an example fifth derate level 508E ('0.') The visual output 500 can be presented via the user interface 108 of FIG. 1 and/or any other suitable means (e.g., an interface of the navigation system 118, a mobile device of the user, etc.).

The example components 506A, 506B, 506C, 506D, 506E are components of the brake system 102 that can overheat after repeated use. In the illustrated example of FIG. 5, the first derate level 508A is the derate level of the first component 506A, the second derate level 508B is the derate level of the second component 506B, the third derate level 508C is the derate level of the third component 506C, the fourth derate level 508D is the derate level of the fourth component 506D, and the fifth derate level 508E is the derate level of the fifth component 506E. The derate levels 508A, 508B, 508C, 508D, 508E correspond to the relative performance capabilities of the respective ones of the components 506A, 506B, 506C, 506D, 506E. In some examples, the derate levels 508A, 508B, 508C, 508D, 508E can be calculated by the brake controller 104 (e.g., the brake thermal health estimator circuitry 306 of FIG. 3, etc.) based on the temperature(s) of the respective components 506A, 506B, 506C, 506D, 506E and a thermal model associated with the components. In some such examples, the derate levels can correspond to the temperature of the corresponding component (e.g., a derate level of 0 corresponds to a component temperature not exceeding a first temperature threshold, a derate level of 1 corresponds to a component temperature exceeding the first temperature threshold, a derate level of 2 corresponds to a component temperature exceeding a second temperature threshold greater than the first temperature threshold, a derate level of 3 corresponds to a component temperature exceeding a third temperature threshold greater than the second temperature threshold, etc.) In other examples, the derate level can be determined by any other suitable means (e.g., performance metrics determined by the brake performance determiner circuitry 312, etc.).

FIG. 6 is an illustration of another example visual output 600 of the brake controller 104 of FIGS. 1-3. In the illustrated example of FIG. 6, the visual output 600 includes an example first element 602, an example second element 604, and an example third element 606. The first element 602 is the deceleration capability of the vehicle 100. In the illustrated example of FIG. 6, the first element 602 has a value of 0.63 g (e.g., 63% of gravitational acceleration, etc.). In some examples, the value of the first element 602 (e.g., the deceleration capability of the brake system 102, etc.) can be calculated by the brake controller 104 (e.g., the brake performance determiner circuitry 312, etc.) based on the derate levels of the brake components (e.g., the derate levels 508A, 508B, 508C, 508D, 508E of the components 506A, 506B, 506C, 506D, 506E of FIG. 5, etc.). Additionally or alternatively, the value of the first element 602 can be calculated based on an output of the brake pressure health estimator circuitry 310 (e.g., based on a comparison of an actual deceleration rate of the vehicle 100 and an expected deceleration rate, etc.).

The second element 604 is a calculated cooldown time for the brake system 102. For example, the value of the second element 604 can be calculated by the cooldown time determiner circuitry 314 based on the temperature of the brake components, a thermal model of the vehicle 100, and/or the ambient conditions of the vehicle 100 (e.g., an ambient temperature, an ambient humidity, an ambient radiance, an ambient wind speed, etc.). In other examples, the value of the second element can be calculated by any other suitable means. In some examples, the calculated cooldown time can be based on a time required to return each of the derate levels 508A, 508B, 508C, 508D, 508E of the components 506A, 506B, 506C, 506D, 506E to 0. In other examples, the calculated cooldown times can be based on any other suitable end temperature.

The third element 606 is a recommendation for a user of the vehicle 100. In the illustrated example of FIG. 6, the third element 606 includes a text string that instructs a user of the vehicle 100 to stop the vehicle 100 at the next exit (e.g., the exit associated with location 414 of FIGS. 4 and 7, etc.). In the illustrated example of FIG. 6, the recommendation to use the next exit is generated based on the deceleration capability of the vehicle 100 (e.g., the value of the first element 602, etc.) not satisfying a minimum deceleration capability. In other examples, the third element 606 can be blank (e.g., if the deceleration capability satisfies the minimum deceleration capability, etc.) and/or for other mitigation actions (e.g., pull-over to a rest area, use a run-away truck ramp, change lanes, etc.). Example recommendations and alerts are described below in conjunction with the operations 1000 of FIG. 10.

Figure 7:
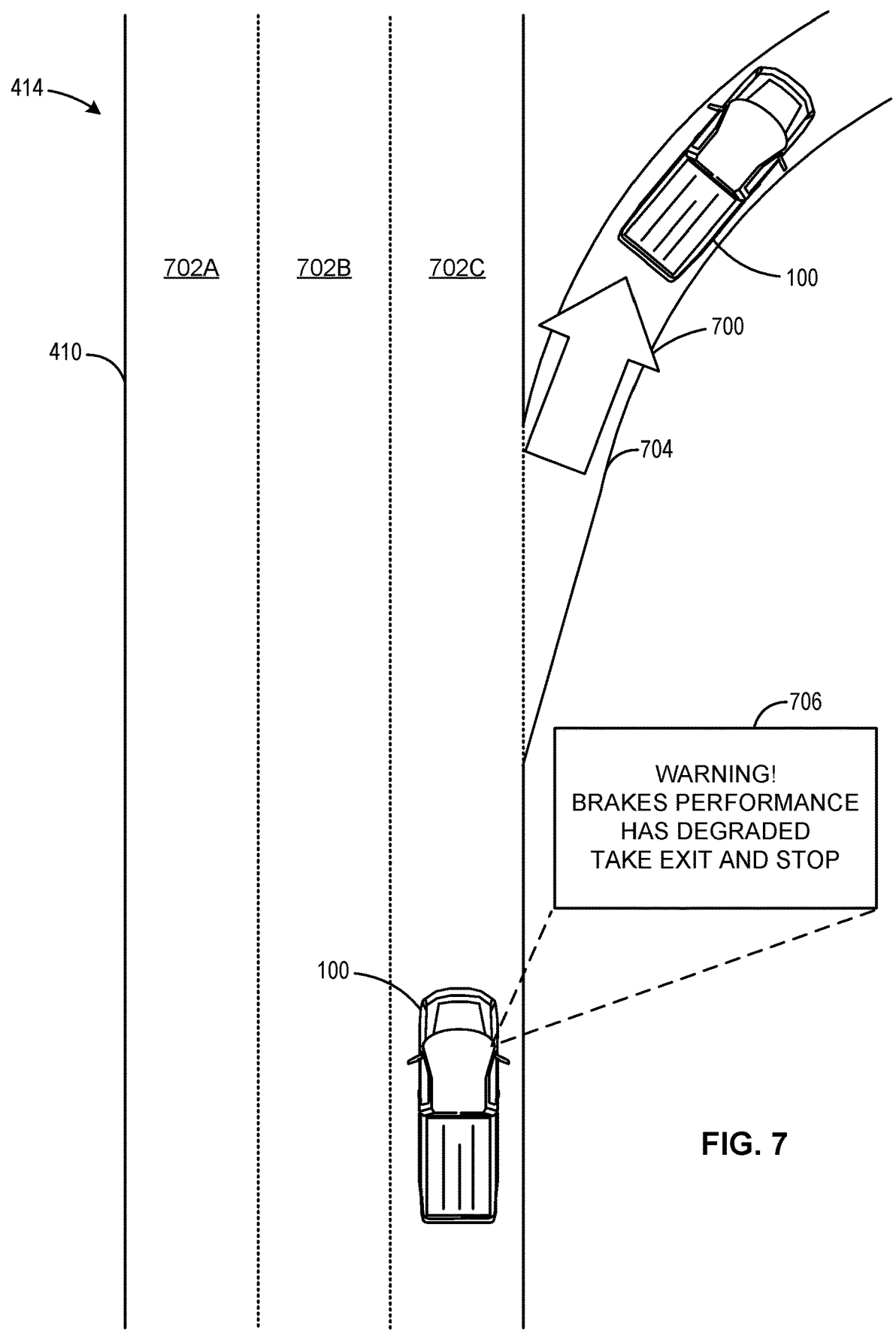
FIGS. 7 and 8 are example illustrations of vehicle navigation prompted in response to an output of the braking controller of FIGS. 1-3.

FIG. 7 is a simplified illustration of an example first vehicle action 700 at the first location 414 of FIG. 4 prompted in response to an output of the brake controller 104 of FIGS. 1-3. In the illustrated example of FIG. 7, the vehicle 100 is following the route 400 on the second portion 410, which includes an example first lane 702A, an example second lane 702B, and an example third lane 702C. In the illustrated example of FIG. 7, an example exit lane 704 is disposed next to the third lane 702C. In the illustrated example of FIG. 7, an example alert 706 has been issued to a user of the vehicle 100.

In the illustrated example of FIG. 7, the brake controller 104 has issued the alert 706 to a user of the vehicle 100 after detecting that the deceleration capability of the brake system 102 (not illustrated) no longer satisfies a first deceleration threshold (e.g., the third threshold described below in conjunction with block 1020 of FIG. 10, etc.). In some examples, the brake controller 104 initiates a braking health check event at or prior to the first location 414. In some such examples, the brake controller 104 initiates a brake health check event at or prior to the first location 414 because the first location 414 corresponds to the location of the last exit (e.g., the exit 704, etc.) prior to the comparatively steep grade of the third portion 412. In some examples, the brake controller 104 can generate a brake health check event at a preset distance from the exit 704 (e.g., 1000 feet, half a mile, one mile, etc.) and/or a preset time from the exit 704 based on a current speed of the vehicle 100 (e.g., 1 minute prior to the exit 704, 2 minutes prior to the exit 704, etc.).

In the illustrated example of FIG. 7, the alert 706 informs a driver of the vehicle 100 that the performance of the brake system 102 has derated/degraded. In the illustrated example of FIG. 7, the alert 706 indicates the user should take the exit 704 and stop the vehicle 100. In the illustrated example of FIG. 7, the alert 706 is a visual alert (e.g., presented via the user interface 108, etc.). Additionally or alternatively, the alert 706 can include audio elements (e.g., presented via a speaker of the vehicle 100, etc.), tactile elements (e.g., via a vibration of a steering wheel, etc.), and/or additional visual indicators (e.g., dashboard indicators, an alert presented to a mobile device of the user, etc.). In some examples, the brake controller 104 can, via the system interface circuitry 318, cause the navigation system 118 to change the route 400 to indicate the vehicle 100 should exit via the exit 704. In some examples, after receiving the alert 706, a user of the vehicle 100 initiates the vehicle action 700 by navigating the vehicle 100 to take the exit 704.

Additionally or alternatively, if the vehicle 100 includes an autonomous driving system (e.g., the vehicle 100 is a partially autonomous vehicle, the vehicle 100 is a fully autonomous vehicle, etc.), the brake controller 104 can, via the autonomous driving interface 120, cause the vehicle 100 to undergo the vehicle action 700 automatically. For example, the autonomous driving interface 120 can interface with vehicle systems (e.g., the steering system, the powertrain 116, the brake system 102, etc.) of the vehicle 100 to undertake the vehicle action 700.

Figure 8:
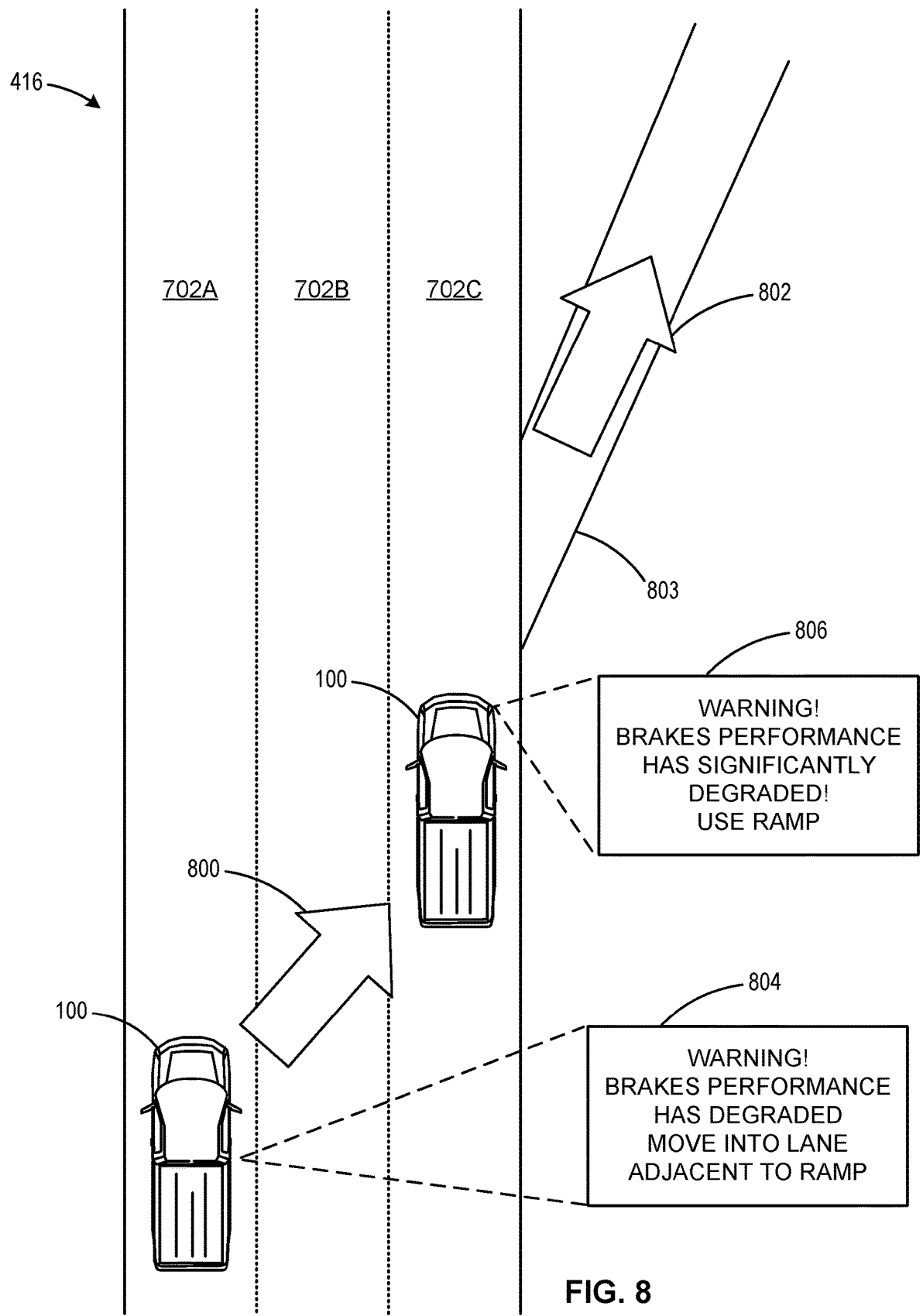

FIG. 8 is an illustration of a second example vehicle action 800 and an example third vehicle action 802 at the second location 416 of FIG. 4 prompted in response to an output of the brake controller 104 of FIGS. 1-3. In the illustrated example of FIG. 8, the vehicle 100 is following the route 400 on the third portion 412, which includes the lanes 702A, 702B, 702C. In the illustrated example of FIG. 8, an example truck ramp 803 is disposed next to the third lane 702C. In the illustrated example of FIG. 8, prior to undertaking the second vehicle action 800, the brake controller 104 issues an example second alert 804. In the illustrated example of FIG. 8, prior to undertaking the third vehicle action 802, the brake controller 104 issues an example second alert 806.

The third portion 416 has a comparatively steep grade (e.g., 4%, 5%, 6%, etc.). The brake controller 104 can continuously generate brake health check events while the vehicle 100 is traveling on the third portion 412. For example, the brake controller 104 can initiate a brake health check event whenever the brake system 102 is engaged during operation of the vehicle 100 (e.g., whenever a user of the vehicle 100 engages the brakes, etc.). Additionally or alternatively, the brake controller 104 can periodically generate brake health check events (e.g., every minute, every 30 seconds, every two minutes, etc.).

In the illustrated example of FIG. 8, the brake controller 104 has issued the alert 804 to a user of the vehicle 100 after detecting that the deceleration capability of the brake system 102 (not illustrated) no longer satisfies a second deceleration threshold (e.g., the first threshold described below in conjunction with block 1004 of FIG. 10). In the illustrated example of FIG. 8, the alert 804 indicates the user should move to the third lane 702C. In some examples, by moving to the third lane 702C, the vehicle 100 has an opportunity to use the truck ramp 803 to decelerate should the condition of the brake system 102 not improve. In the illustrated example of FIG. 8, after the vehicle 100 undertakes the vehicle action 800, the brake controller 104 issues the alert 804 to a user of the vehicle 100 after detecting that the deceleration capability of the brake system 102 no longer satisfies a third deceleration threshold (e.g., the second threshold described below in conjunction with block 1020 of FIG. 10). In the illustrated example of FIG. 8, the alert 804 indicates the user should use the truck ramp 803 to decelerate the vehicle 100 and/or allow the brake system 102 to cool. In some examples, the thresholds associated with the first alert 804 and the second alert 806 are the same. In other examples, the threshold associated with the second alert 806 can correspond to a greater amount of brake degradation than the threshold associate with the first alert.

In the illustrated example of FIG. 8, the alerts 804, 806 are visual alerts (e.g., presented via the user interface 108, etc.). Additionally or alternatively, the alerts 804, 806 can include audio elements (e.g., presented via a speaker of the vehicle 100, etc.), tactile elements (e.g., vibration of the steering wheel, etc.), and/or additional visual indicators (e.g., dashboard indicators, an alert presented to a mobile device of the user, etc.). In some examples, the brake controller 104 can, via the system interface circuitry 318, cause the navigation system 118 to change the route 400 to indicate the vehicle 100 should take change lanes to the third lane 702C and/or use truck ramp 803, respectively. Additionally or alternatively, if the vehicle 100 includes an autonomous driving system (e.g., the vehicle 100 is a partially autonomous vehicle, the vehicle 100 is a fully autonomous vehicle, etc.), the brake controller 104 can, via the autonomous driving interface 120, cause the vehicle 100 to undergo the vehicle actions 800, 802 automatically.

Figure 9:
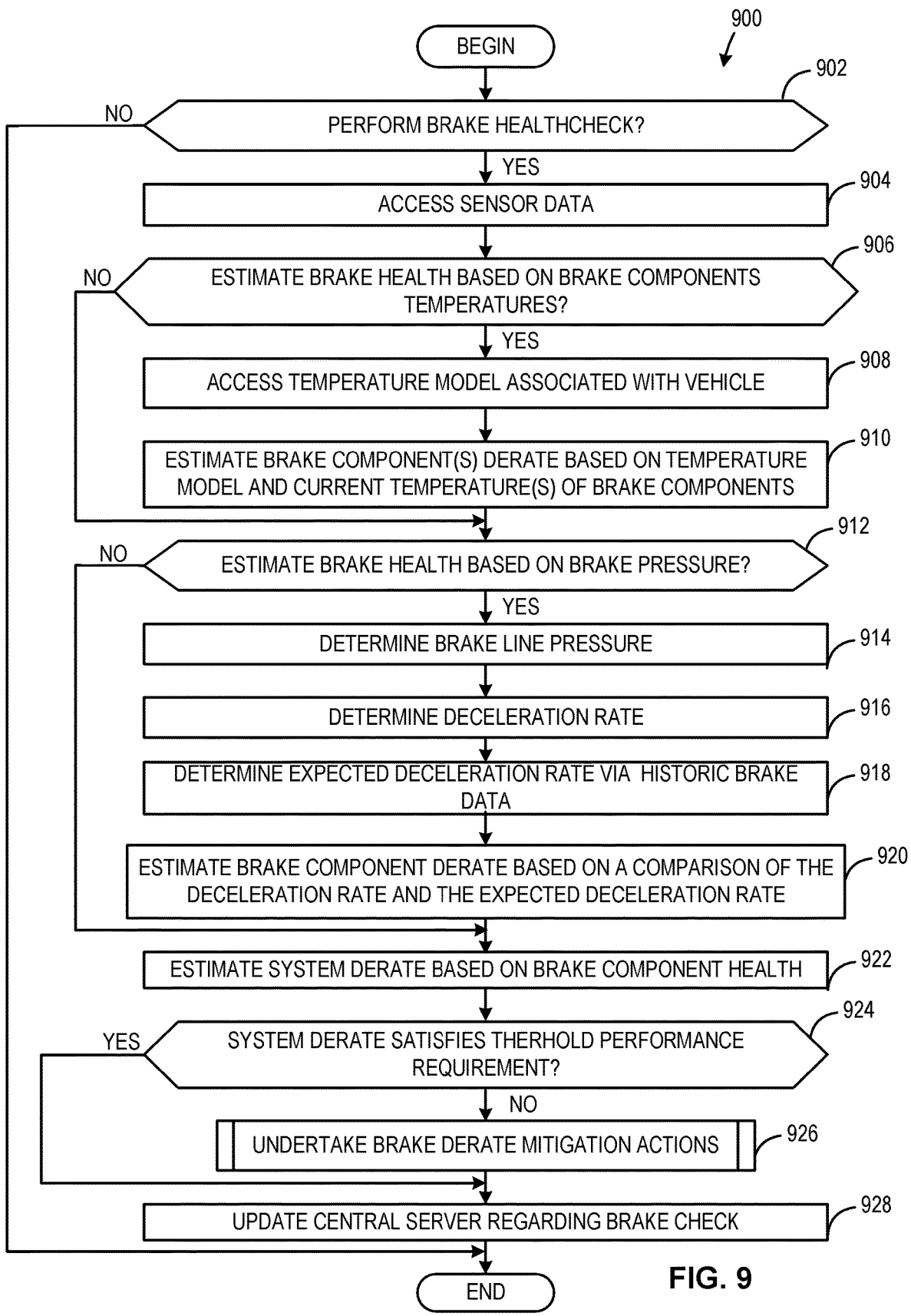
FIGS. 9 and 10 are flowcharts representative of example machine readable instructions that may be executed by example processor circuitry to implement the brake controller of FIGS. 1-3.
Figure 10:
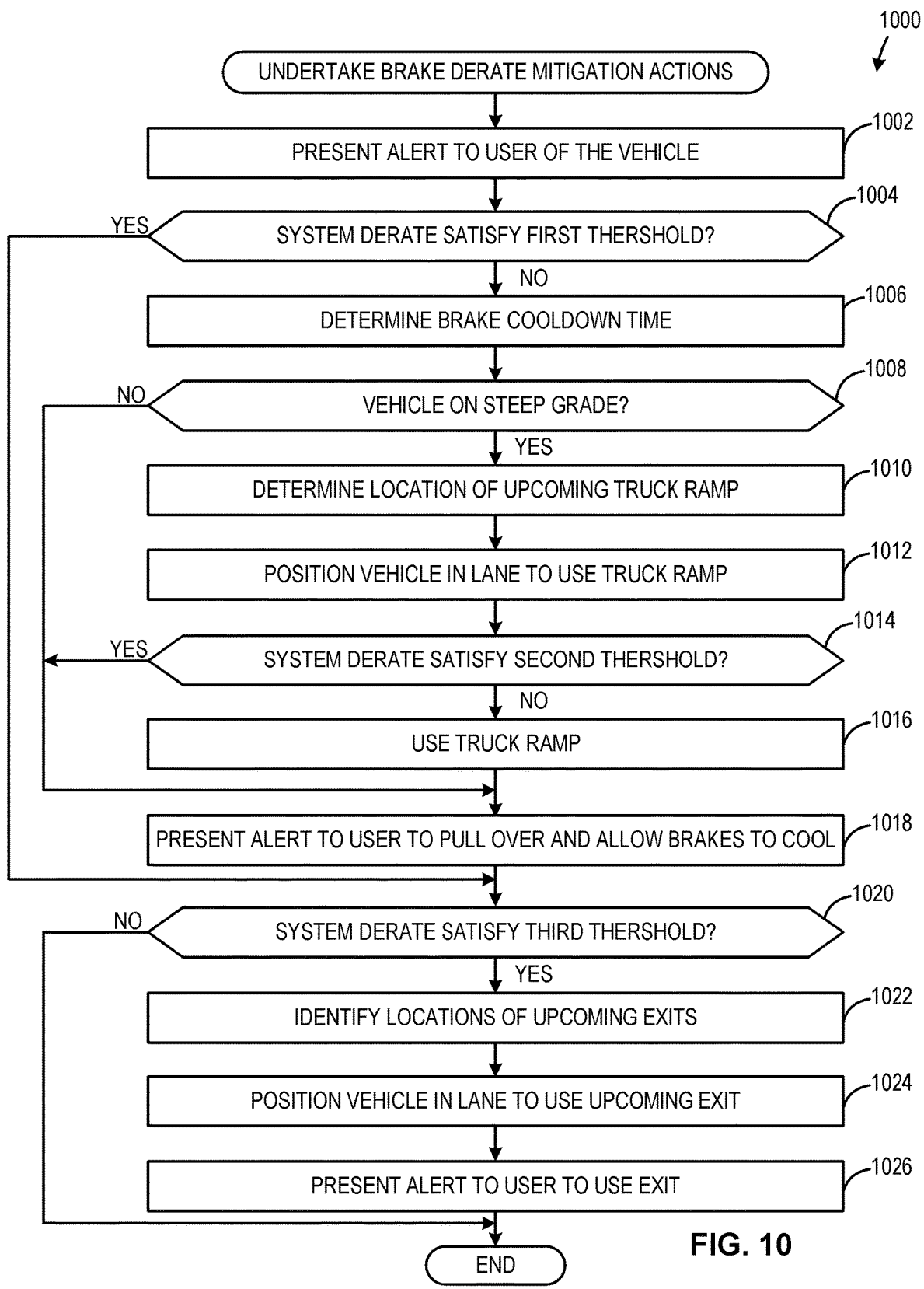

Flowcharts representative of example hardware logic circuitry, machine readable instructions, hardware implemented state machines, and/or any combination thereof for implementing the brake controller 104 of FIGS. 1-3 is shown in FIGS. 9 and 10. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 9 and 10, many other methods of implementing the example brake controller 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9 and 10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed and/or instantiated by processor circuitry to perform a brake health check event. The machine readable instructions and/or the operations 900 of FIG. 9 begin at block 902, at which the user interface circuitry 302 determines if a brake health check event is to be performed. For example, the user interface circuitry 302 can detect a request for a brake health check event input via the user interface 108 and/or the autonomous driving interface 120. In other examples, the user interface circuitry 302 can automatically initiate a brake health check event in response to detecting an upcoming steep grade (e.g., the steep grade associated with the third portion 412 of the route 400, etc.) and/or road condition. In some examples, the user interface circuitry 302 can generate a brake check health event periodically (e.g., based on a user preference, based on a manufacturing setting, based on a quality/characteristic of the route 400, based on a previously determined deceleration capability of the vehicle 100, based on a load of the vehicle 100, and/or based an environmental condition of the route 400, etc.). If the user interface circuitry 302 determines a brake health check event is to be performed, the operations 900 advance to block 904. If the user interface circuitry 302 determines a brake health check event is not to be performed, the operations 900 end.

At block 904, the sensor interface circuitry 304 accesses sensor data associated with the vehicle 100. For example, the sensor interface circuitry 304 can receive sensor data from the sensors 208A, 208B, 208C, 208D, 110 of the example vehicle 100 and/or brake system 102. In some examples, the sensor interface circuitry 304 can transform the received sensor data from a machine-readable format (e.g., a voltage, a current, etc.) to a human-readable format (e.g., a string, a floating-point number, an integer, etc.).

At block 906, the brake thermal health estimator circuitry 306 determines if the brake health is to be estimated via the temperatures of the brake components. For example, the brake thermal health estimator circuitry 306 can determine if the brake health is to be estimated via component temperature based on a user input, a manufacturer setting, a capability of the sensors 110, etc. If the brake thermal health estimator circuitry 306 determines the brake health is to be estimated via component temperature, the operations 900 advance to block 908. If the brake thermal health estimator circuitry 306 determines the brake health is not to be estimated via component temperature, the operations 900 advance to block 912.

At block 908, the memory interface circuitry 308 accesses a temperature model associated with the vehicle 100. For example, the memory interface circuitry 308 can interface with a memory associated with the vehicle 100 (e.g., the local memory 1116 of FIG. 11, the volatile memory 1114 of FIG. 11, the non-volatile memory 1116 of FIG. 11, the mass storage 1128 of FIG. 11, etc.). In other examples, the memory interface circuitry 308 and/or the network interface circuitry 316 can access the temperature model via the network 112 (e.g., from a manufacturer of the vehicle 100, etc.).

At block 910, the brake thermal health estimator circuitry 306 can estimate the brake component derate based on the temperature model and current temperature(s) of the brake components. For example, the brake thermal health estimator circuitry 306 can use a thermal model and/or a look-up table retrieved by the memory interface circuitry 308 during the execution of block 908 to determine the derate of individual brake components (e.g., the information associated with the components 506A, 506B, 506C, 506D, 506E of FIG. 5, etc.). In such examples, the brake thermal health estimator circuitry 306 can use the current temperature of the individual brake components, the ambient temperature, etc. as inputs into the thermal model and/or look-up table.

At block 912, the brake pressure health estimator circuitry 310 determines if the brake health is to be estimated via brake pressure. For example, the brake pressure health estimator circuitry 310 can determine if the brake health is to be estimated via brake pressure based on a user input, a manufacturer setting, a capability of the sensors 110, a property of the brake system 102, etc. If the brake pressure health estimator circuitry 310 determines the brake health is to be estimated via brake pressure, the operations 900 advance to block 914. If the brake pressure health estimator circuitry 310 determines the brake health is not to be estimated via brake pressure, the operations 900 advance to block 922.

At block 914, the brake pressure health estimator circuitry 310 determines the brake line pressure. For example, the brake pressure health estimator circuitry 310 can determine the brake line pressure based on sensor data received by the sensor interface circuitry 304 during the execution of block 904. Additionally or alternatively, the brake pressure health estimator circuitry 310 can estimate the brake line pressure based on the travel of the brake pedal and/or any other suitable metrics. At block 916, the brake pressure health estimator circuitry 310 determines the deceleration rate. For example, the brake pressure health estimator circuitry 310 can determine the actual deceleration rate of the vehicle 100 via sensor data received by the sensor interface circuitry 304 during the execution of block 904. In other examples, the brake pressure health estimator circuitry 310 can determine the deceleration rate via the navigation system 118.

At block 918, the memory interface circuitry 308 determines an expected deceleration rate via historic brake data. For example, the memory interface circuitry 308 can interface with a memory associated with the vehicle 100 (e.g., the local memory 1116 of FIG. 11, the volatile memory 1114 of FIG. 11, the non-volatile memory 1116 of FIG. 11, the mass storage 1128 of FIG. 11, etc.). In other examples, the memory interface circuitry 308 and/or the network interface circuitry 316 can access the historic brake data via the network 112 (e.g., from a manufacturer of the vehicle 100, etc.). In some such examples, the historic brake data can include data associated with the vehicle 100 and/or other vehicles with similar specifications (e.g., make, model, brake system, load, load distribution, etc.)

At block 920, the brake pressure health estimator circuitry 310 estimates the brake component health derate based on the comparison of the deceleration rate and the expected deceleration rate. For example, the brake pressure health estimator circuitry 310 can determine the relationship of the actual deceleration rate to the expected deceleration rate. In some examples, if the actual deceleration rate is substantially equal to the expected deceleration rate, the brake pressure health estimator circuitry 310 can estimate the brake system 102 is not derated. In some examples, if the actual deceleration rate is substantially less than the expected deceleration rate, the brake pressure health estimator circuitry 310 can determine the magnitude of the derate based on the comparison.

At block 922, the brake performance determiner circuitry 312 estimates the system derate based on the brake component health. For example, the brake performance determiner circuitry 312 can estimate an overall system derate based on the output of the brake pressure health estimator circuitry 310 during the execution of block 920 and/or the brake thermal health estimator circuitry 306 during the execution of block 910. In some examples, the brake performance determiner circuitry 312 can determine the health of the brake system 102 as a function of the deceleration capability of the vehicle 100. For example, the brake performance determiner circuitry 312 can determine an actual deceleration capability as a function of a required deceleration capability (e.g., a percentage of the required deceleration capability. In other examples, the brake performance determiner circuitry 312 can determine the overall brake system 102 by any other suitable means.

At block 924, the brake performance determiner circuitry 312 determines if the system derate satisfies a threshold performance requirement. For example, the brake performance determiner circuitry can compare the actual deceleration capability to a threshold (e.g., 105%, 150%, etc.). If the brake performance determiner circuitry 312 determines the system derate does not satisfy the threshold, the operations 900 advance to block 926. If the brake performance determiner circuitry 312 determines the system derate satisfies the threshold, the operations 900 advance to block 928.

At block 926, the brake controller 104 undertakes brake derate mitigation actions. For example, the brake controller 104 can present alerts to a user of the vehicle 100, cause the vehicle 100 to navigate to a specific location, etc. Example operations associated to implement block 926 are described below in conjunction with FIG. 10.

At block 928, the network interface circuitry 316 updates the central server regarding brake health check event. For example, the network interface circuitry 316 can log the system derate, system performance parameters, and/or related mitigation actions with the central server 114 via the network 112. In other examples, the execution of block 928 can be omitted.

FIG. 10 is a flowchart representative of example machine readable instructions and/or example operations 1000 that may be executed and/or instantiated by processor circuitry to mitigate the effects of brake component derate. The machine readable instructions and/or the operations 1000 of FIG. 10 begin at block 1002, at which the user interface circuitry 302 presents alerts to a user of the vehicle 100. For example, the user interface circuitry 302 can cause the user to present a visual, audio, and/or haptic alert via the user interface 108. Additionally or alternatively, the user interface circuitry 302 can modify a GUI (e.g., the visual output 500 of FIG. 5, etc.) by changing a graphical element of the GUI (e.g., changing the color of the derate levels 508A of FIG. 5, etc.). In other examples, the user interface circuitry 302 can alert a user of the vehicle 100 by any other suitable means.

At block 1004, the cooldown time determiner circuitry 314 determines the brake cooldown time. For example, the cooldown time determiner circuitry 314 can estimate the amount of time required for the components of the brake system with high derate levels to cool to normal operating temperatures. In some examples, the cooldown time determiner circuitry 314 can calculate the required time based on an ambient temperature of the vehicle 100 and/or a thermal model associated with the brake component. In some examples, the brake thermal health estimator circuitry 306 can apply a margin (e.g., 10%, 50%, etc.) to the calculated cooldown time to ensure that the brake system 102 sufficiently cools prior to continued operation by the driver. Additionally or alternatively, the cooldown time determiner circuitry 314 can estimate the required cooldown time by any other suitable means.

At block 1006, the cooldown time determiner circuitry 314 determines if the system derate satisfies a first threshold. For example, the cooldown time determiner circuitry 314 can compare the overall derate level of the brake system 102 (e.g., as determined during the execution of block 922 of FIG. 9, etc.) to a first threshold. In some examples, the first threshold can be based on a manufacturer and/or a user setting. Additionally or alternatively, the first threshold can correspond to a minimum required deceleration rate. In some such examples, the minimum required deceleration rate can be based on a manufacturer requirement, an insurance requirement, etc. In other examples, the first threshold can be based on any other suitable means. If the cooldown time determiner circuitry 314 determines the system derate satisfies the first threshold, the operations 1000 advance to block 1020. If the cooldown time determiner circuitry 314 determines the system derate does not satisfy the first threshold, the operations 1000 advance to block 1008.

At block 1008, the grade determiner circuitry 320 determines if the vehicle 100 is on a steep grade. For example, the grade determiner circuitry 320 determines the magnitude of the grade the vehicle is on via sensor data from the vehicle sensors 110 (e.g., a sensor associated with a safety system of the vehicle 100. In some examples, the grade determiner circuitry 320 can compare the determined grade to a threshold grade. If the grade determiner circuitry 320 determines the vehicle 100 is on a steep grade, the operations 1000 advance to block 1010. If the grade determiner circuitry 320 determines the vehicle 100 is not on a steep grade, the operations 1000 advance to block 1018.

At block 1010, the system interface circuitry 318 determines the location of the next upcoming truck ramp. For example, the system interface circuitry 318 can interface with the navigation system 118 to identify the next upcoming truck ramp that is usable by the vehicle 100. In other examples, the next upcoming truck can be identified by any other suitable means (e.g., via a camera associated with the vehicle 100, via a user input, etc.).

At block 1012, the user interface circuitry 302 and/or the system interface circuitry 318 causes the vehicle 100 to maneuver into a lane to use a truck ramp (e.g., the truck ramp 803 of FIG. 8, etc.). For example, the user interface circuitry 302 and/or the system interface circuitry 318 can cause the vehicle 100 to undergo the vehicle action 800 into the lane 702C to use the ramp 803 of FIG. 8. In some examples, the user interface circuitry 302 can present an instruction to a user via the user interface 108 of the vehicle 100 to move into a lane adjacent to the truck ramp. Additionally or alternatively, the system interface circuitry 318, via the autonomous driving interface 120, cause an autonomous driving system of the vehicle 100 to move into the lane 702C. In other examples, the user interface circuitry 302 and/or the system interface circuitry 318 can cause the vehicle 100 to move into a lane to use a truck ramp by any other suitable means.

At block 1014, the brake performance determiner circuitry 312 determines if the system derate satisfies a second threshold. For example, the brake performance determiner circuitry 312 can compare the overall derate level of the brake system 102 (e.g., as determined during the execution of block 922 of FIG. 9, etc.) to a second threshold. In some examples, the first threshold can be based on a manufacturer and/or user setting. Additionally or alternatively, the second threshold can correspond to a minimum required deceleration rate. In some such examples, the minimum required deceleration rate can be based on a manufacturer requirement, an insurance requirement, etc. In some examples, the second threshold can be determined based on the first threshold (e.g., equal to the first threshold, a factor of the first threshold, etc.). In other examples, the second threshold can be based on any other suitable means. If the brake performance determiner circuitry 312 determines the system derate satisfies the second threshold, the operations 1000 advances to block 1018. If the brake performance determiner circuitry 312 determines the system derate does not satisfy the second threshold, the operations 1000 advance to block 1016.

At block 1016, the user interface circuitry 302 and/or the system interface circuitry 318 causes the vehicle 100 to use truck ramp 803. For example, the user interface circuitry 302 and/or the system interface circuitry 318 can cause the vehicle 100 to use the ramp 803 of FIG. 8. In some examples, the user interface circuitry 302 can present an instruction to a user via the user interface 108 of the vehicle 100 to use the truck ramp 803. Additionally or alternatively, the system interface circuitry 318, via the autonomous driving interface 120, cause an autonomous driving system of the vehicle 100 to move onto the truck ramp 803. In other examples, the user interface circuitry 302 and/or the system interface circuitry 318 can cause the vehicle 100 to use a truck ramp by any other suitable means.

At block 1018, the user interface circuitry 302 presents an alert to the user of the vehicle 100 to pull over and allow brake system 102 to cool. For example, the user interface circuitry 302 can cause the user to present a visual, audio, and/or haptic alert via the user interface 108. In some examples, the generated alert includes an estimation of the amount of time required to cool the components of the brake system 102 (e.g., via the cooldown element 604 of FIG. 6, etc.). Additionally or alternatively, the user interface circuitry 302 can modify a visual output (e.g., the visual output 600 of FIG. 6, etc.) by changing a graphical element of the GUI (e.g., issuing a text warning via the recommendation element 606 of FIG. 6, etc.). In other examples, the user interface circuitry 302 can alert a user of the vehicle 100 by any other suitable means.

At block 1020, the brake performance determiner circuitry 312 determines if the system derate satisfies a third threshold. The brake performance determiner circuitry 312 determines if the system derate satisfies a third threshold. For example, the brake performance determiner circuitry 312 can compare the overall derate level of the brake system 102 (e.g., as determined during the execution of block 922 of FIG. 9, etc.) to a third threshold. In some examples, the third threshold can be based on a manufacturer and/or user setting. Additionally or alternatively, the third threshold can correspond to a minimum required deceleration rate. In some such examples, the minimum required deceleration rate can be based on a manufacturer requirement, an insurance requirement, etc. In some examples, the second threshold can be determined based on the first threshold and/or the second threshold, (e.g., equal to the first threshold, equal to the second threshold, a factor of the first threshold, a factor of the second threshold, etc.). If the brake performance determiner circuitry 312 determines the system derate satisfies the second threshold, the operations 1000 advances to block 1022. If the brake performance determiner circuitry 312 determines the system derate does not satisfy the second threshold, the operations 1000 advances to block 1016.

At block 1022, the system interface circuitry 318 identifies locations of upcoming exits. For example, the system interface circuitry 318 can interface with the navigation system 118 to identify the next upcoming exit that is usable by the vehicle 100. In other examples, the next upcoming exit can be identified by any other suitable means (e.g., via a camera associated with the vehicle 100, via a user input, etc.).

At block 1024, the user interface circuitry 302 and/or the system interface circuitry 318 causes the vehicle 100 to maneuver into a lane to use the next upcoming exit. For example, the user interface circuitry 302 and/or the system interface circuitry 318 can cause the vehicle 100 to use the move into the lane 702C of FIG. 7 to use the exit 704. In some examples, the user interface circuitry 302 can present an instruction to a user via the user interface 108 of the vehicle 100 to move in lane to use the next upcoming exit. Additionally or alternatively, the system interface circuitry 318, via the autonomous driving interface 120, cause an autonomous driving system of the vehicle 100 to move into the lane 702C. In other examples, the user interface circuitry 302 and/or the system interface circuitry 318 can cause the vehicle 100 to use a lane by any other suitable means.

At block 1026, the user interface circuitry 302 and/or the system interface circuitry 318 causes the vehicle 100 to use the next exit 704. For example, the user interface circuitry 302 can cause the user to present a visual, audio, and/or haptic alert via the user interface 108. In some examples, the generated alert includes directions and/or instructions on how to reach the exit. Additionally or alternatively, the user interface circuitry 302 can modify a GUI (e.g., the visual output of FIG. 6, etc.) by changing a graphical element of the GUI (e.g., issuing a text warning via the recommendation element 606 of FIG. 6, etc.). In some examples, the user interface circuitry 302 can modify an output of the navigation system 118 of FIG. 1 (e.g., modifying a route to use the exit, overlaying a display to emphasize the exit, etc.). In other examples, the user interface circuitry 302 can alert a user of the vehicle 100 by any other suitable means. The operations 1000 end.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the user interface circuitry 302, the sensor interface circuitry 304, the brake thermal health estimator circuitry 306, the memory interface circuitry 308, the brake pressure health estimator circuitry 310, the brake performance determiner circuitry 312, the cooldown time determiner circuitry 314, the network interface circuitry 316, and the system interface circuitry 318, and the example grade determiner circuitry 320.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1132, which may be implemented by the machine readable instructions of FIGS. 9 and 10, may be stored in the mass storage device 1128, in the volatile memory 1114, in the non-volatile memory 1116, and/or on a removable non-transitory computer readable storage medium such as a CD or DVD.

Figure 11:
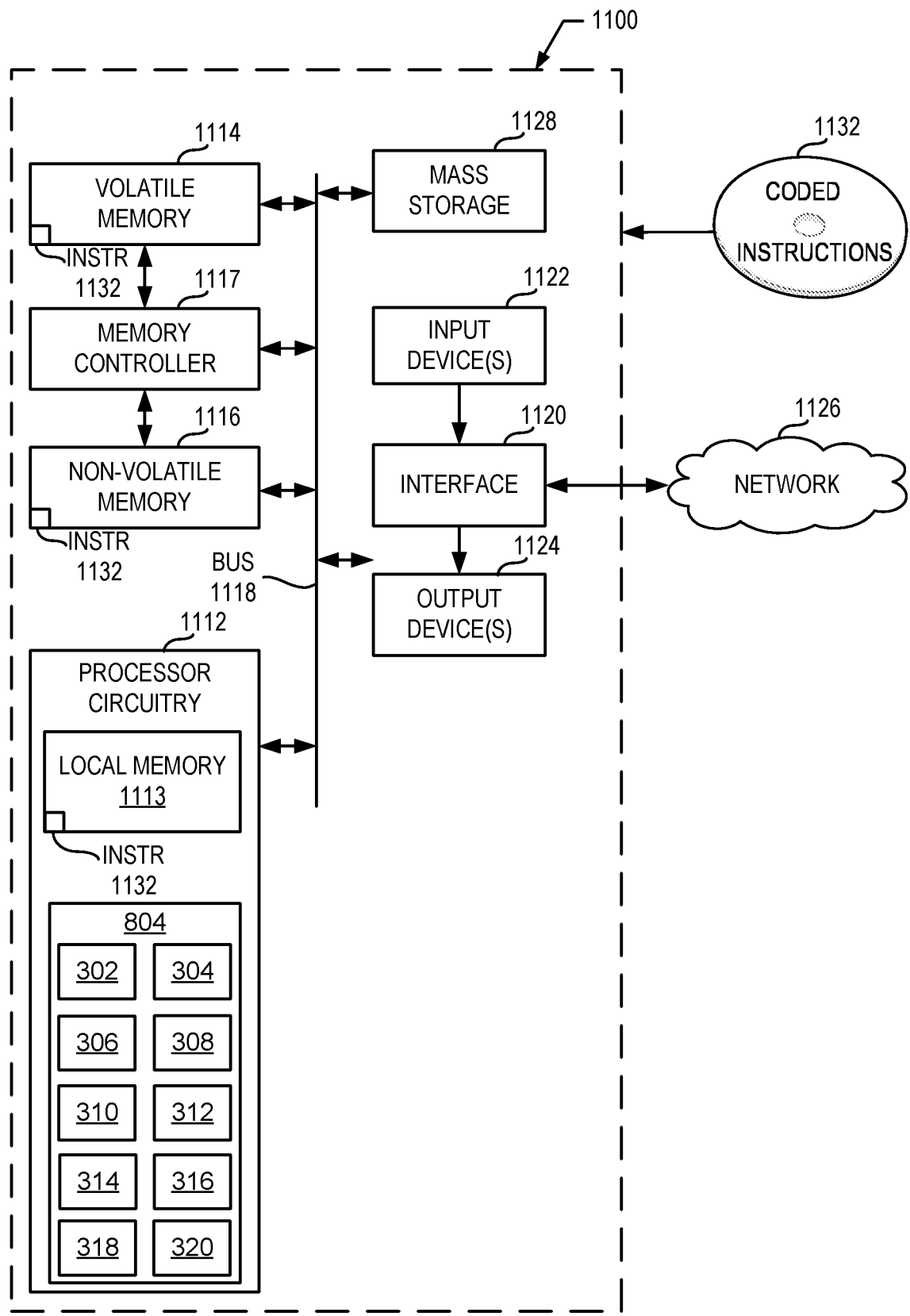
FIG. 11 is a block diagram of an example processing platform including processor circuitry structured to execute the example machine readable instructions of FIGS. 9-10 to implement the brake controller of FIGS. 1-3.
Figure 12:
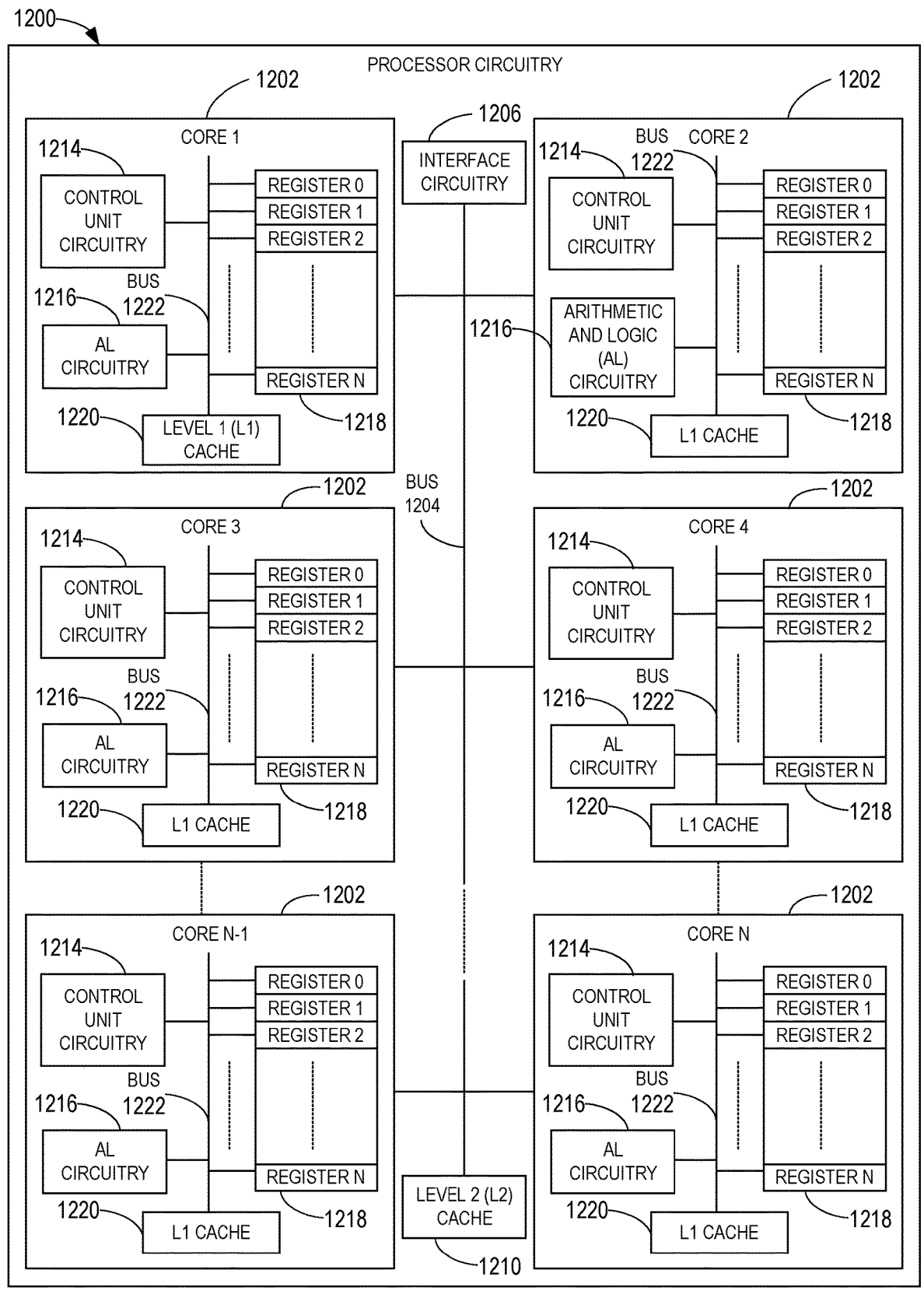
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a general purpose microprocessor 1200. The general purpose microprocessor circuitry 1200 executes some or all of the machine readable instructions of the flowcharts of FIGS. 9 and 10 to effectively instantiate the circuitry of FIG. 3 as logic circuits to perform the operations corresponding to those machine readable instructions. In some such examples, the circuitry of FIG. 3 is instantiated by the hardware circuits of the microprocessor 1200 in combination with the instructions. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowcharts of FIGS. 9 and 10.

The cores 1202 may communicate by a first example bus 1204. In some examples, the first bus 1204 may implement a communication bus to effectuate communication associated with one(s) of the cores 1202. For example, the first bus 1204 may implement at least one of an Inter-Integrated Circuit (I2C) bus, a Serial Peripheral Interface (SPI) bus, a PCI bus, or a PCIe bus. Additionally or alternatively, the first bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and a second example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The second bus 1222 may implement at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
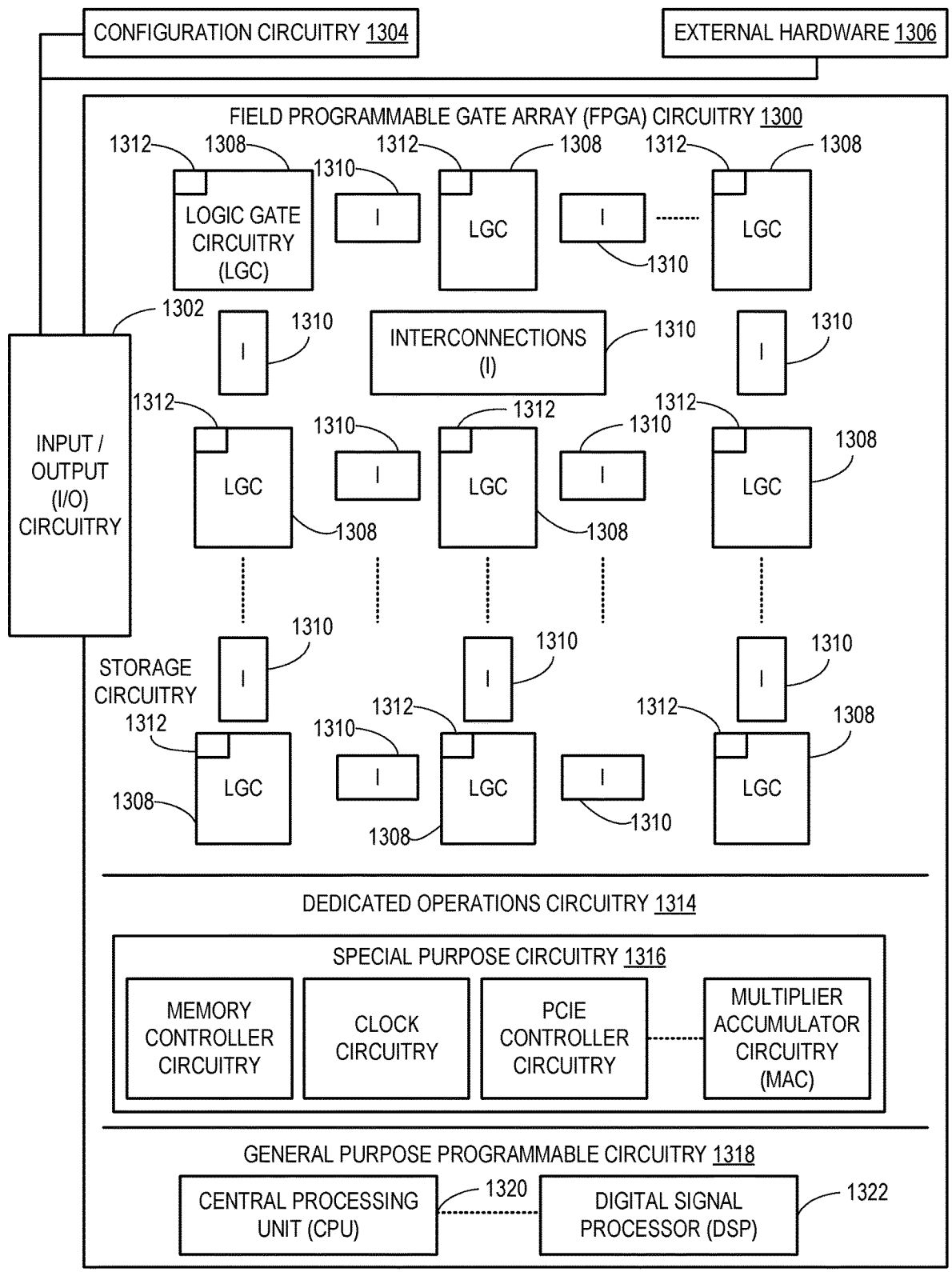
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowcharts of FIGS. 9 and 10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIGS. 9 and 10. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIGS. 9 and 10. As such, the FPGA circuitry 1300 may be structured to effectively instantiate some or all of the machine readable instructions of the flowcharts of FIGS. 9 and 10 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 9 and 10 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine readable instructions of FIGS. 9 and 10 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIGS. 9 and 10 may be executed by one or more of the cores 1202 of FIG. 12, a second portion of the machine readable instructions represented by the flowcharts of FIGS. 9 and 10 may be executed by the FPGA circuitry 1300 of FIG. 13, and/or a third portion of the machine readable instructions represented by the flowcharts of FIGS. 9 and 10 may be executed by an ASIC. It should be understood that some or all of the circuitry of FIG. 3 may, thus, be instantiated at the same or different times. Some or all of the circuitry may be instantiated, for example, in one or more threads executing concurrently and/or in series. Moreover, in some examples, some or all of the circuitry of FIG. 3 may be implemented within one or more virtual machines and/or containers executing on the microprocessor.

In some examples, the processor circuitry 1112 of FIG. 11 may be in one or more packages. For example, the processor circuitry 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Methods and apparatus to determine brake pad wear are disclosed herein. Further examples and combinations thereof include the following:

Example 1 includes a vehicle comprising a brake, memory, and a processor to execute instructions to detect the vehicle is in operation on a road, determine a deceleration capability of the brake in response to a first brake check event, compare the deceleration capability of the vehicle to a first threshold, and in response to determining the deceleration capability of the vehicle does not satisfy the first threshold, cause the vehicle to navigate to an exit of the road prior to a portion of the road with a grade higher than a threshold grade.

Example 2 includes the vehicle of example 1, wherein the processor further executes instructions to detect, by accessing a navigation system, the portion of the road, and identify, by accessing the navigation system, the exit, and generate the first brake check event a predetermined distance on the road before the exit.

Example 3 includes the vehicle of example 2, wherein the exit is adjacent to the portion of the road.

Example 4 includes the vehicle of example 1, wherein the processor executes instructions to determine the deceleration capability by engaging the brake at a brake pressure, comparing an actual deceleration rate of the vehicle to an expected deceleration rate of the vehicle, the expected deceleration rate based on the brake pressure, and determining a brake capability of the vehicle based on the comparison.

Example 5 includes the vehicle of example 1, wherein the brake includes a brake component and the processor executes instructions to determine the deceleration capability by comparing a temperature of the brake component to a temperature threshold.

Example 6 includes the vehicle of example 5, wherein the processor executes instructions to determining a cooldown time based on the temperature of the brake component, in response to determining the deceleration capability of the vehicle does not satisfy a second threshold identifying an upcoming area to stop the vehicle, the upcoming area adjacent to the road, and alerting a user of the vehicle to stop the vehicle in the upcoming area, the alert including the cooldown time.

Example 7 includes the vehicle of example 1, wherein the processor further executes instructions to generate a second brake check event, a duration between the first brake check event and the second brake check event based on at least one of a quality of the road, the deceleration capability of the vehicle, a load of the vehicle, or an environmental condition of the road.

Example 8 includes a non-transitory computer readable medium comprising instructions, which when executed, cause a processor to detect a vehicle is in operation on a road with a grade, the grade higher than a threshold grade, determine a deceleration capability of a brake of the vehicle, compare the deceleration capability of the vehicle to a first threshold, and in response to determining the deceleration capability of the vehicle does not satisfy the first threshold, cause the vehicle to navigate from a first lane to a second lane, second lane closer to a runaway truck ramp than the first lane.

Example 9 includes the non-transitory computer readable medium of example 8, wherein the instructions, when executed, further cause the processor to, in response to determining the deceleration capability of the vehicle does not satisfy a second threshold, navigate the vehicle to the runaway truck ramp.

Example 10 includes the non-transitory computer readable medium of example 8, wherein the instructions, when executed, further cause the processor to engage the brake at a brake pressure, compare an actual deceleration rate of the vehicle to an expected deceleration rate of the vehicle, the expected deceleration rate based on the brake pressure, and determine a braking capability of the vehicle based on the comparison.

Example 11 includes the non-transitory computer readable medium of example 8, wherein the instructions, when executed, further cause the processor to determine the deceleration capability by comparing a temperature of a brake component of the brake to a temperature threshold.

Example 12 includes the non-transitory computer readable medium of example 8, wherein the instructions, when executed, further cause the processor to determine a cooldown time based on a temperature of the brake.

Example 13 includes the non-transitory computer readable medium of example 8, wherein the vehicle is an autonomous vehicle.

Example 14 includes the non-transitory computer readable medium of example 8, wherein the first threshold is based on at least one of a magnitude of the grade, a load of the vehicle, or an environmental condition of the road.

Example 15 includes a method comprising detecting a vehicle is in operation on a road, determine a deceleration capability of a brake of the vehicle in response to a first brake check event, comparing the deceleration capability of the vehicle to a first threshold, and in response to determining the deceleration capability of the vehicle does not satisfy the first threshold, causing the vehicle to navigate to an exit of the road prior to a portion of the road with a grade higher than a threshold grade.

Example 16 includes the method of example 15, further including detecting, by accessing a navigation system, the portion of the road, and identifying, by accessing the navigation system, the exit, and generating the first brake check event a predetermined distance on the road before the exit.

Example 17 includes the method of example 15, wherein the determining the deceleration capability includes engaging the brake at a brake pressure, comparing an actual deceleration rate of the vehicle to an expected deceleration rate of the vehicle, the expected deceleration rate based on the brake pressure, and determining a brake capability of the vehicle based on the comparison.

Example 18 includes the method of example 15, wherein the determining the deceleration capability includes comparing a temperature of a brake component of the brake to a temperature threshold.

Example 19 includes the method of example 18, further including determining a cooldown time based on the temperature of the brake component, in response to determining the deceleration capability of the vehicle does not satisfy a second threshold identifying an upcoming area to stop the vehicle, the upcoming area adjacent to the road, and alerting a user of the vehicle to stop the vehicle in the upcoming area, the alert including the cooldown time.

Example 20 includes the method of example 15, further including generating a second brake check event, a duration between the first brake check event and the second brake check event based on at least one of a quality of the road, the deceleration capability of the vehicle, a load of the vehicle, or an environmental condition of the road. The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A vehicle comprising:
a brake;
a memory; and
a processor to execute instructions to:
    detect that the vehicle is in operation on a road;
    detect, by accessing a navigation system, a portion of the road with a grade greater than a threshold grade;
    identify, by accessing the navigation system, an exit of the road prior to the portion of the road;
    generate a first brake check event at a predetermined distance before the exit;
    determine a deceleration capability of the vehicle in response to the first brake check event;
    compare the deceleration capability of the vehicle to a first performance threshold; and
    in response to determining that the deceleration capability of the vehicle does not satisfy the first performance threshold, cause the vehicle to navigate to the exit.

2. The vehicle of claim 1, wherein the exit is a last exit prior to the portion of the road.

3. The vehicle of claim 1, wherein the processor executes instructions to determine the deceleration capability by:
    engaging the brake at a brake pressure;
    comparing the actual deceleration rate of the vehicle to an expected deceleration rate of the vehicle, the expected deceleration rate based on the brake pressure; and
    determining a brake capability of the vehicle based on the comparison between the actual deceleration rate and the expected deceleration rate.

4. The vehicle of claim 1, wherein the brake includes a brake component and the processor executes instructions to determine the deceleration capability by comparing a temperature of the brake component to a temperature threshold.

5. The vehicle of claim 4, wherein the processor executes instructions to:
    determine a cooldown time based on the temperature of the brake component; and
    in response to determining that the deceleration capability of the vehicle does not satisfy a second performance threshold:
        identify an upcoming area to stop the vehicle, the upcoming area adjacent to the road; and
        alert a user of the vehicle to stop the vehicle in the upcoming area, the alert including the cooldown time.

6. The vehicle of claim 1, wherein the processor further executes instructions to generate a second brake check event, a duration between the first brake check event and the second brake check event based on at least one of a quality of the road, the deceleration capability of the vehicle, a load of the vehicle, or an environmental condition of the road.

7. A non-transitory computer readable medium comprising instructions, which when executed, cause a processor to:
    detect that a vehicle is in operation on a road;
    detect, by accessing a navigation system, a portion of the road with a grade greater than a threshold grade;
    identify, by accessing the navigation system, an exit of the road prior to the portion of the road;
    generate a first brake check event at a predetermined distance before the exit;
    determine a deceleration capability of the vehicle in response to the first brake check event;
    compare the deceleration capability of the vehicle to a first performance threshold; and
    in response to determining that the deceleration capability of the vehicle does not satisfy the first performance threshold, cause the vehicle to navigate to the exit.

8. The non-transitory computer readable medium of claim 7, wherein the instructions, when executed, further cause the processor to:
    engage a brake of the vehicle at a brake pressure;
    compare an actual deceleration rate of the vehicle to an expected deceleration rate of the vehicle, the expected deceleration rate based on the brake pressure; and
    determine a braking capability of the vehicle based on the comparison between the actual deceleration rate and the expected deceleration rate.

9. The non-transitory computer readable medium of claim 7, wherein the instructions, when executed, further cause the processor to determine the deceleration capability by comparing a temperature of a brake component of a brake of the vehicle to a temperature threshold.

10. The non-transitory computer readable medium of claim 7, wherein the instructions, when executed, further cause the processor to determine a cooldown time based on a temperature of a brake of the vehicle.

11. The non-transitory computer readable medium of claim 7, wherein the vehicle is an autonomous vehicle.

12. The non-transitory computer readable medium of claim 7, wherein the first performance threshold is based on at least one of a magnitude of the grade, a load of the vehicle, or an environmental condition of the road.

13. A method comprising:
    detecting that a vehicle is in operation on a road;
    detecting, by accessing a navigation system, a portion of the road with a grade greater than a threshold grade;
    identifying, by accessing the navigation system, an exit of the road prior to the portion of the road;
    generating a first brake check event at a predetermined distance before the exit;
    determining a deceleration capability of the vehicle in response to the first brake check event;
    comparing the deceleration capability of the vehicle to a first performance threshold; and
    in response to determining that the deceleration capability of the vehicle does not satisfy the first performance threshold, causing the vehicle to navigate to the exit.

14. The method of claim 13, wherein determining the deceleration capability includes:
    engaging a brake of the vehicle at a brake pressure;
    comparing an actual deceleration rate of the vehicle to an expected deceleration rate of the vehicle, the expected deceleration rate based on the brake pressure; and
    determining a brake capability of the vehicle based on the comparison between the actual deceleration rate and the expected deceleration rate.

15. The method of claim 13, wherein determining the deceleration capability includes comparing a temperature of a brake component of a brake of the vehicle to a temperature threshold.

16. The method of claim 15, further including:
    determining a cooldown time based on the temperature of the brake component; and in response to determining that the deceleration capability of the vehicle does not satisfy a second performance threshold:
  identifying an upcoming area to stop the vehicle, the upcoming area adjacent to the road; and
  alerting a user of the vehicle to stop the vehicle in the upcoming area, the alert including the cooldown time.

17. The method of claim 13, further including generating a second brake check event, a duration between the first brake check event and the second brake check event based on at least one of a quality of the road, the deceleration capability of the vehicle, a load of the vehicle, or an environmental condition of the road.

18. The vehicle of claim 4, wherein the brake component is a first brake component, the temperature is a first temperature, and the processor executes instructions to further determine the deceleration capability based on the first temperature, a second temperature of a second brake component, a thermal model of the vehicle, and an ambient temperature of the vehicle.

19. The vehicle of claim 18, wherein the first brake component is a brake pad and the second brake component is an electronic brake component.

20. The vehicle of claim 18, wherein the processor executes instructions to determine the first performance threshold based on historic braking data of the vehicle.

* * * * *

UNITED STATES PATENT AND TRADEMARK OFFICE
CERTIFICATE OF CORRECTION

PATENT NO. : 12,325,396 B2
APPLICATION NO. : 17/751383
DATED : June 10, 2025
INVENTOR(S) : Salter et al.

Page 1 of 1

It is certified that error appears in the above-identified patent and that said Letters Patent is hereby corrected as shown below:

In the Claims
In Column 33, Claim 1, Line 11, delete "a".
In Column 33, Claim 1, Line 13, delete "that".
In Column 33, Claim 1, Line 15, insert --and--.
In Column 33, Claim 1, Line 18, delete "at".
In Column 33, Claim 1, Line 19, insert --on the road--.
In Column 33, Claim 1, Line 24, delete "that".
In Column 33, Claim 3, Line 33, delete "the" and insert --an--.
In Column 33, Claim 3, Line 37, delete "between the actual deceleration rate and the expected deceleration rate".
In Column 33, Claim 5, Line 46, delete "and".
In Column 33, Claim 5, Line 47, delete "that".
In Column 33, Claim 7, Line 63, delete "that".
In Column 33, Claim 7, Line 65, insert --and--.
In Column 34, Claim 7, Line 1, delete "at".
In Column 34, Claim 7, Line 2, insert --on the road--.
In Column 34, Claim 7, Line 7, delete "that".
In Column 34, Claim 8, Line 18, delete "between the actual deceleration rate and the expected deceleration rate".
In Column 34, Claim 13, Line 38, delete "that".
In Column 34, Claim 13, Line 40, insert --and--.
In Column 34, Claim 13, Line 43, delete "at".
In Column 34, Claim 13, Line 44, insert --on the road--.
In Column 34, Claim 13, Line 49, delete "that".
In Column 34, Claim 14, Line 59, delete "between the actual deceleration rate and the expected deceleration rate".
In Column 34, Claim 15, Line 61, insert --the--.
In Column 34, Claim 16, Line 67, delete "and".
In Column 35, Claim 16, Line 1, delete "that".

Signed and Sealed this
Twenty-second Day of July, 2025

Coke Morgan Stewart
*Acting Director of the United States Patent and Trademark Office*